US012594744B2

(12) United States Patent
Ishida et al.

(10) Patent No.: US 12,594,744 B2
(45) Date of Patent: Apr. 7, 2026

(54) INTERLAYER FILM FOR LAMINATED GLASS, AND LAMINATED GLASS

(71) Applicant: SEKISUI CHEMICAL CO., LTD., Osaka (JP)

(72) Inventors: Jun Ishida, Shiga (JP); Hiromitsu Nishino, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 408 days.

(21) Appl. No.: 17/798,443

(22) PCT Filed: Mar. 30, 2021

(86) PCT No.: PCT/JP2021/013569
§ 371 (c)(1),
(2) Date: Aug. 9, 2022

(87) PCT Pub. No.: WO2021/200964
PCT Pub. Date: Oct. 7, 2021

(65) Prior Publication Data

US 2023/0104579 A1 Apr. 6, 2023

(30) Foreign Application Priority Data

Mar. 30, 2020 (JP) ................................ 2020-060540

(51) Int. Cl.
*B32B 15/04* (2006.01)
*B32B 3/26* (2006.01)
(Continued)

(52) U.S. Cl.
CPC ........ *B32B 17/10568* (2013.01); *B32B 3/263* (2013.01); *B32B 17/10036* (2013.01);
(Continued)

(58) Field of Classification Search
CPC ................................................ B32B 17/10036
(Continued)

(56) References Cited

U.S. PATENT DOCUMENTS

2007/0148472 A1* 6/2007 Masaki ............. B32B 17/10981 428/426
2010/0279150 A1* 11/2010 Hatta .................. C08K 5/3417 428/704
(Continued)

FOREIGN PATENT DOCUMENTS

CN 107848881 3/2018
CN 108367979 8/2018
(Continued)

OTHER PUBLICATIONS

Extended European Search Report issued Mar. 22, 2024, in corresponding European Patent Application No. 21780367.5.
(Continued)

*Primary Examiner* — Lauren R Colgan
(74) *Attorney, Agent, or Firm* — WENDEROTH, LIND & PONACK, L.L.P.

(57) ABSTRACT

Provided is an interlayer film for laminated glass capable of preventing a winding core from falling off a roll body of the interlayer film. The interlayer film for laminated glass according to the present invention includes one end and the other end being on an opposite side of the one end, the one end having a thickness of 1.05 mm or less, a first resin layer having a glass transition temperature of less than 15° C., a second resin layer having a glass transition temperature of 15° C. or more, and a region where a total number of laminated layers of the first resin layer and the second resin layer in a thickness direction is five or more, and in the region where the total number of laminated layers is five or more, the region has $Y_1/Z$ being 1.01 or more when a thickness by one layer of surface layers is denoted by $Y_1$ μm
(Continued)

and a thickness by one layer of layers neighboring the surface layers is denoted by Z μm.

11 Claims, 5 Drawing Sheets

(51) Int. Cl.

| | |
|---|---|
| ***B32B 17/06*** | (2006.01) |
| ***B32B 17/10*** | (2006.01) |
| ***B32B 27/08*** | (2006.01) |
| ***B32B 27/30*** | (2006.01) |
| ***B60K 35/23*** | (2024.01) |
| *B60K 35/40* | (2024.01) |
| *B60K 35/50* | (2024.01) |
| *B60K 35/60* | (2024.01) |

(52) U.S. Cl.
CPC .............. *B32B 27/08* (2013.01); *B32B 27/30* (2013.01); *B60K 35/23* (2024.01); *B32B 2250/05* (2013.01); *B32B 2307/412* (2013.01); *B32B 2307/732* (2013.01); *B60K 35/415* (2024.01); *B60K 35/50* (2024.01); *B60K 35/60* (2024.01)

(58) Field of Classification Search
USPC .................................................. 428/426, 428
See application file for complete search history.

(56) References Cited

U.S. PATENT DOCUMENTS

| | | | | |
|---|---|---|---|---|
| 2011/0070415 | A1* | 3/2011 | Nakamura | B32B 17/10761 428/212 |
| 2011/0192525 | A1* | 8/2011 | Kondo | G02F 1/1303 156/99 |
| 2017/0050415 | A1* | 2/2017 | Kanki | B32B 17/10633 |
| 2018/0050519 | A1* | 2/2018 | Nakayama | B24C 3/32 |
| 2018/0162105 | A1* | 6/2018 | Kawate | B32B 27/322 |
| 2018/0281351 | A1* | 10/2018 | Nakamura | B32B 17/10036 |
| 2019/0084276 | A1* | 3/2019 | Oota | B32B 17/10605 |
| 2019/0084277 | A1* | 3/2019 | Nakamura | B32B 17/10605 |
| 2019/0099985 | A1* | 4/2019 | Oota | B32B 17/10605 |
| 2019/0143649 | A1* | 5/2019 | Oota | B32B 17/10541 428/172 |
| 2020/0215798 | A1* | 7/2020 | Aoki | B32B 17/10036 |
| 2021/0046740 | A1 | 2/2021 | Iwamoto et al. | |
| 2021/0268773 | A1 | 9/2021 | Arishima | |

FOREIGN PATENT DOCUMENTS

| | | |
|---|---|---|
| EP | 3 388 402 A1 | 10/2018 |
| EP | 3 466 898 A1 | 4/2019 |
| EP | 3 388 402 B1 | 3/2020 |
| JP | 2007-223883 | 9/2007 |
| WO | 2017/099166 | 6/2017 |
| WO | 2019/151329 | 8/2019 |
| WO | 2020/004577 | 1/2020 |

OTHER PUBLICATIONS

International Search Report (ISR) issued Jul. 6, 2021 in International (PCT) Application No. PCT/JP2021/013569.

International Preliminary Report on Patentability and Written Opinion of the International Searching Authority issued Sep. 29, 2022 in International (PCT) Application No. PCT/JP2021/013569.

Office Action issued Sep. 30, 2025 in Indian Patent Application No. 202247053766, with English-language Translation.

* cited by examiner

[FIG. 1]
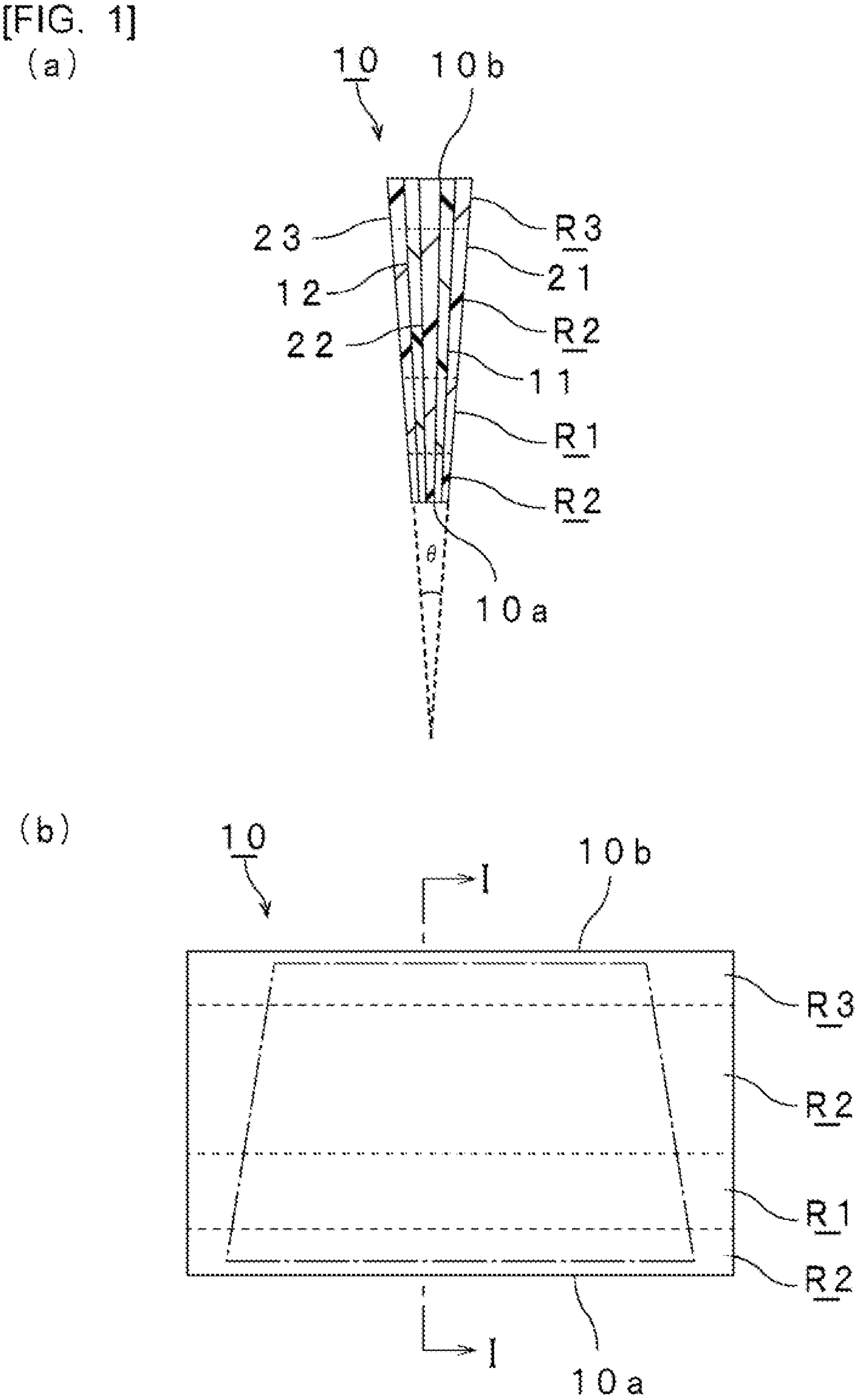

[FIG. 2]
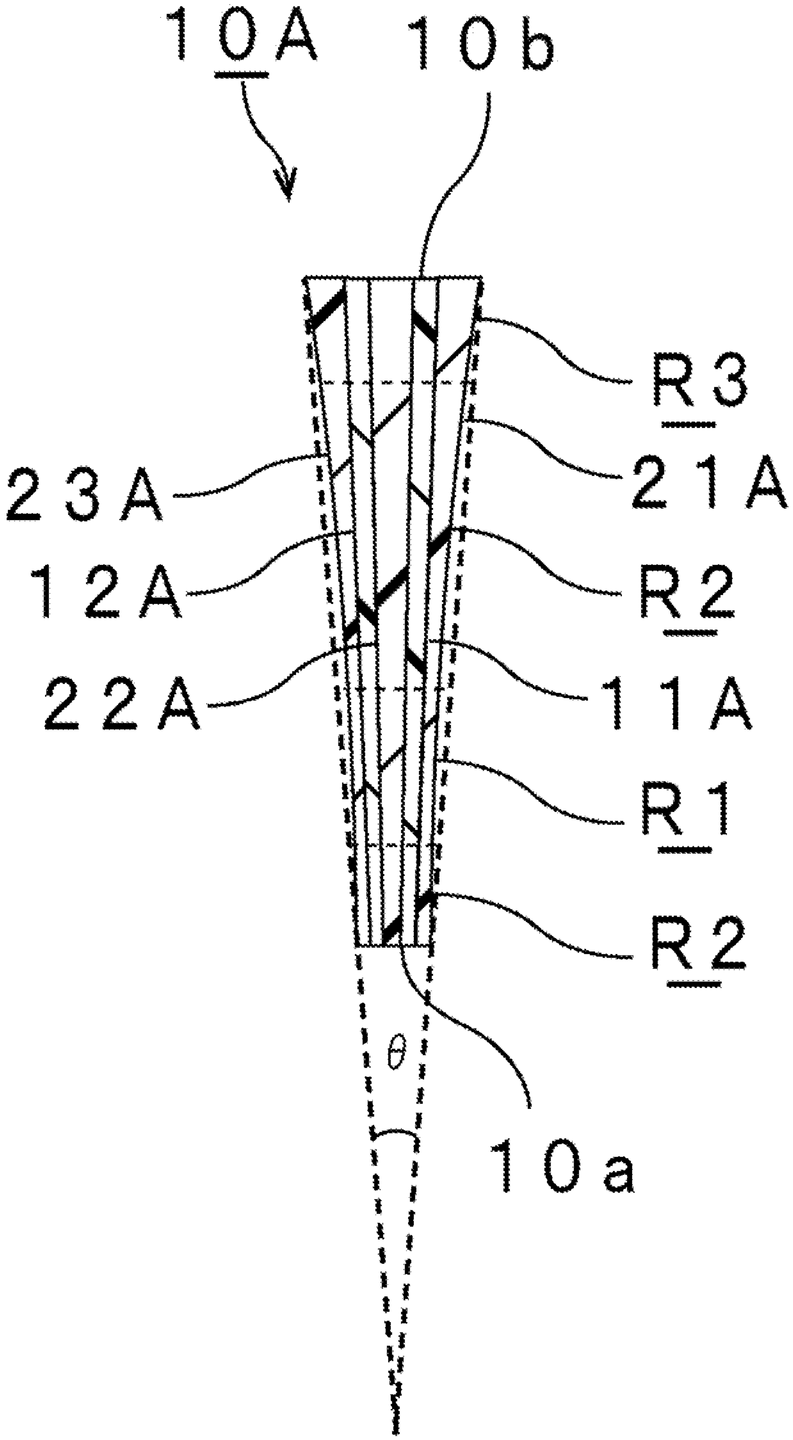

[FIG. 3]
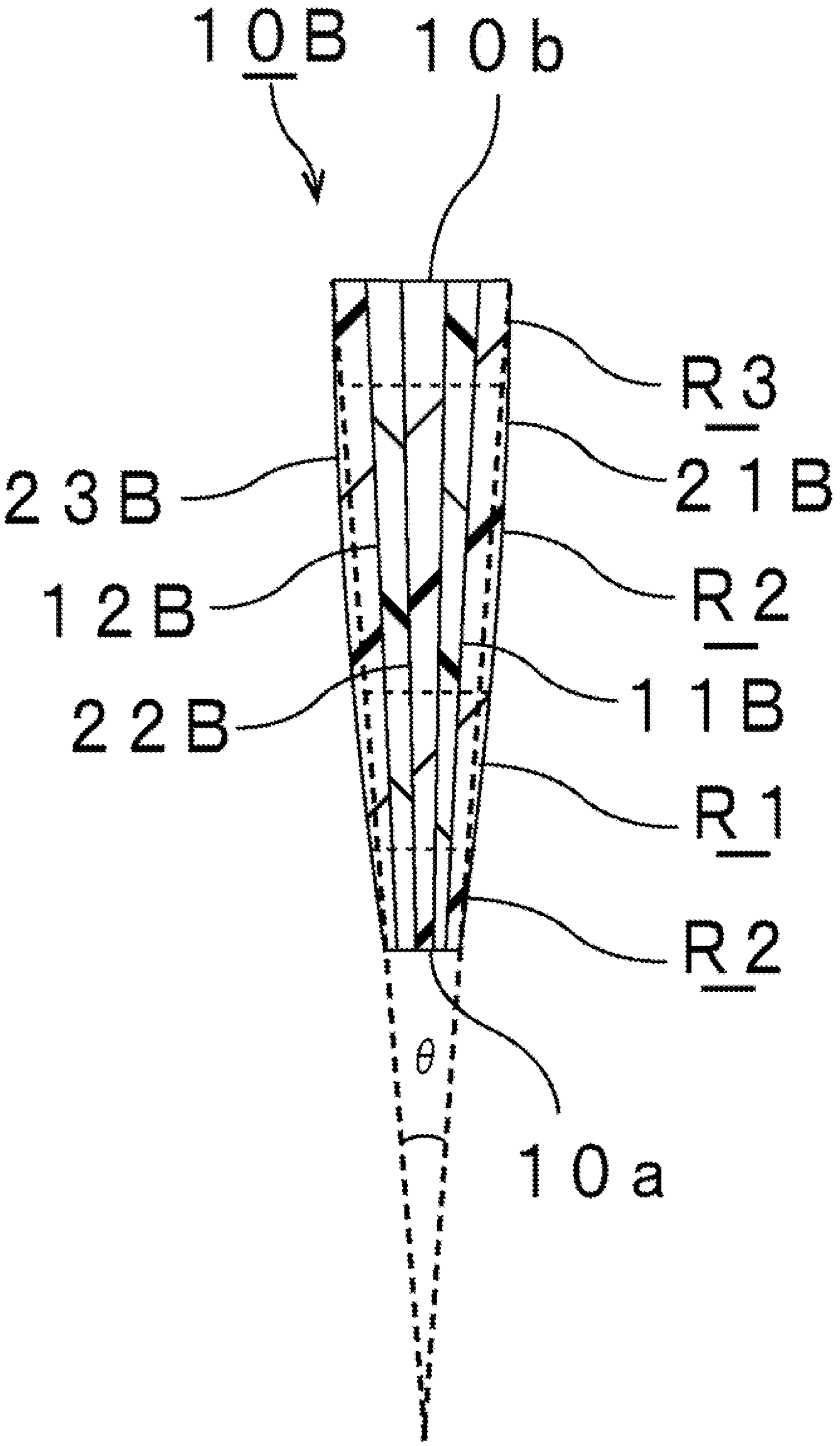

[FIG. 4]
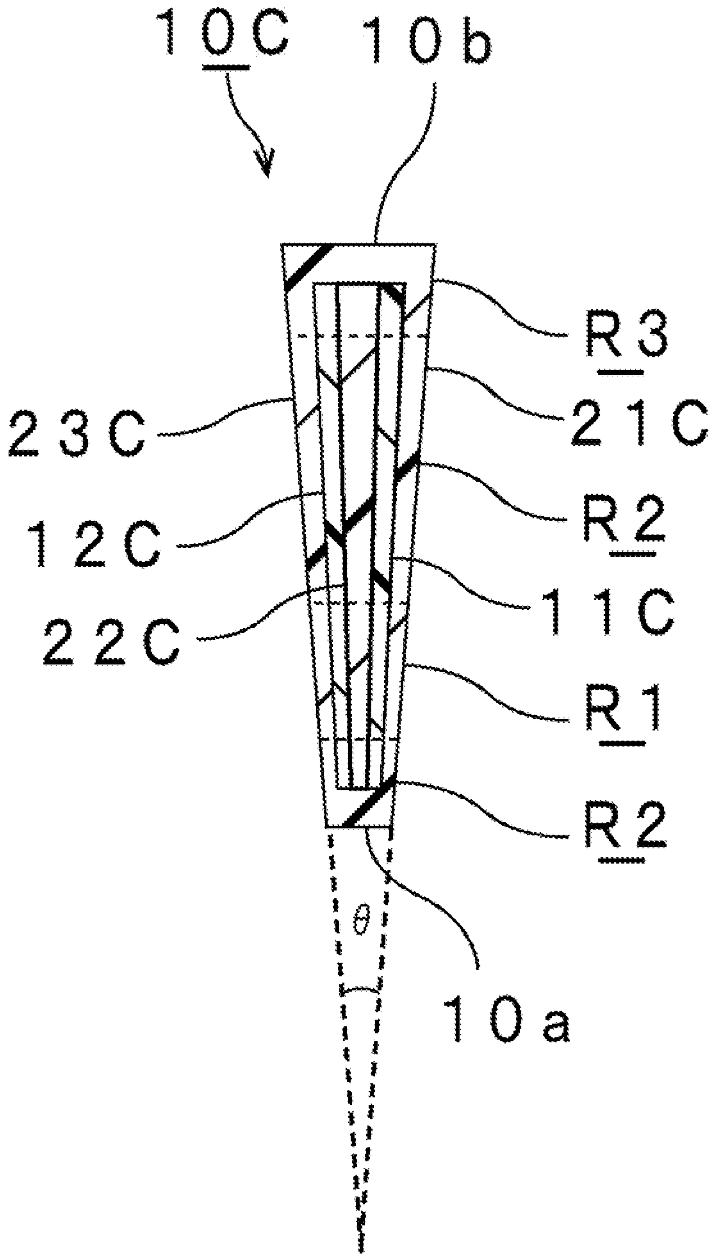

[FIG. 5]
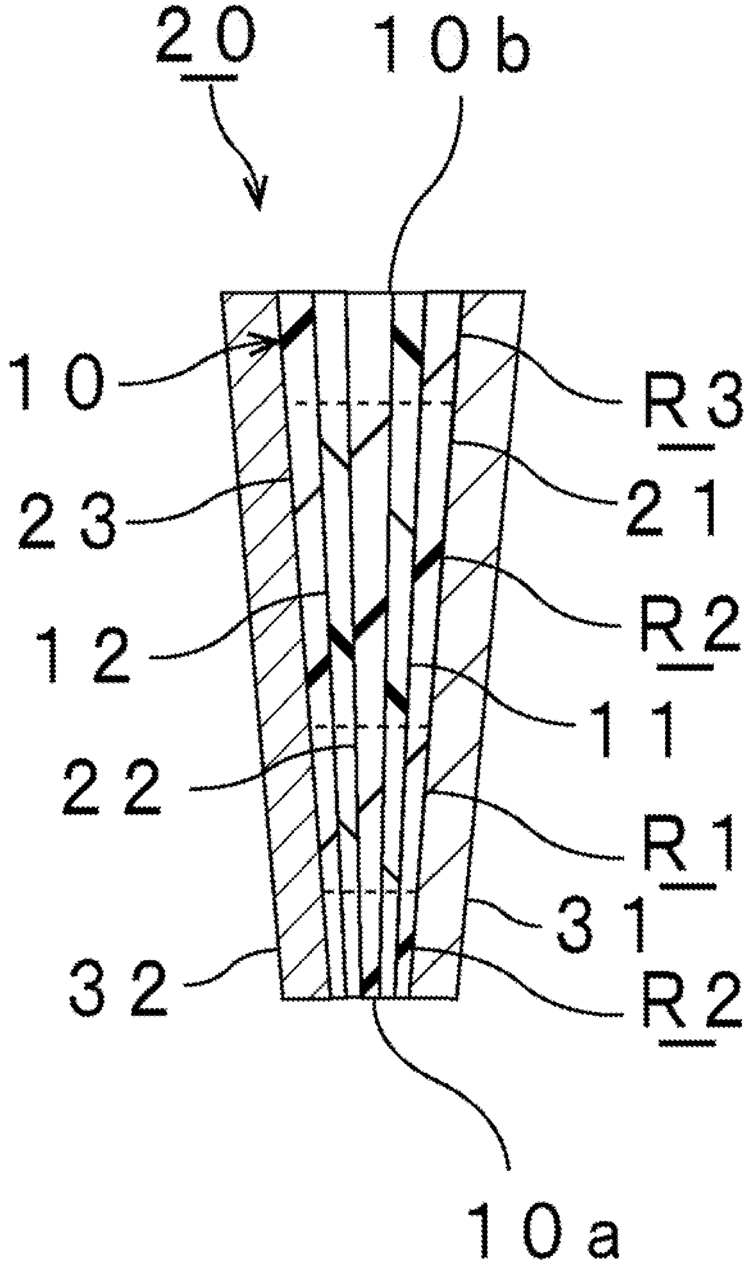

INTERLAYER FILM FOR LAMINATED GLASS, AND LAMINATED GLASS

TECHNICAL FIELD

The present invention relates to an interlayer film for laminated glass that is used for obtaining laminated glass. Moreover, the present invention relates to a laminated glass prepared with the interlayer film for laminated glass.

BACKGROUND ART

Since laminated glass generates only a small amount of scattering glass fragments even when subjected to external impact and broken, laminated glass is excellent in safety. As such, laminated glass is widely used for automobiles, railway vehicles, aircraft, ships, buildings and the like. Laminated glass is produced by sandwiching an interlayer film between a pair of glass plates.

Moreover, as a laminated glass used in automobiles, a head-up display (HUD) has been known. In a HUD, it is possible to display measured information including automobile traveling data such as speed on the windshield of the automobile, and the driver can recognize as if the display were shown in front of the windshield.

As one example of the laminated glass, Patent Document 1 described below discloses a laminated glass for vehicles in which two curved glass plates and a multilayer resin interlayer film are laminated. The resin interlayer film is disposed between the glass plates. In the laminated glass for vehicles, the resin interlayer film has a wedge-like section shape in which the thickness of the upper side is larger than the thickness of the lower side when the laminated glass is attached to a vehicle, and the resin interlayer film is a multilayer film including at least a first resin layer and a second resin layer having a hardness smaller than a hardness of the first resin layer. In the laminated glass for vehicles, the thickness of the first resin layer is 0.3 mm or more in a region with a thickness of 400 mm or less from the lower side.

RELATED ART DOCUMENT

Patent Document

Patent Document 1: JP 2007-223883 A

SUMMARY OF THE INVENTION

Problems to be Solved by the Invention

An interlayer film is wound around the outer periphery of a winding core, and stored in a state of a roll body. When the roll body of the interlayer film is stored vertically, the winding core can fall off the roll body. Especially when the tension at the time of winding the interlayer film around the outer periphery of the winding core is insufficient, and the degree of shrinkage of the interlayer film is not large, the winding core can fall off the roll body during vertical storage of the roll body of the interlayer film.

Also, in an interlayer film in which the thickness of the other end is larger than the thickness of the one end (a so-called wedge-like interlayer film), when the interlayer film is stored in a state of a roll body in which the other end side is downside and the one end side is upside, the one end side having a smaller thickness can buckle to generate a crease due to the difference in tension between the one end side and the other end side. When the wedge-like interlayer film is cut out from the roll body, and the interlayer film is left to stand on a flat part, the crease generated by buckling tends to remain.

It is an object of the present invention to provide an interlayer film for laminated glass capable of preventing a winding core from falling off a roll body of the interlayer film. A definite object of the present invention is to provide an interlayer film for laminated glass capable of preventing a crease from remaining in a wedge-like interlayer film. It is also an object of the present invention to provide a laminated glass prepared with the interlayer film for laminated glass.

Means for Solving the Problems

According to a broad aspect of the present invention, there is provided an interlayer film for laminated glass (in the present specification, "interlayer film for laminated glass" is sometimes abbreviated as "interlayer film") including one end and the other end being on an opposite side of the one end, the one end having a thickness of 1.05 mm or less, a first resin layer having a glass transition temperature of less than 15° C., a second resin layer having a glass transition temperature of 15° C. or more, and a region where a total number of laminated layers of the first resin layer and the second resin layer in a thickness direction is five or more, the region where the total number of laminated layers is five or more, the region having $Y_1/Z$ being 1.01 or more when a thickness by one layer of surface layers is denoted by $Y_1$ μm and a thickness by one layer of layers neighboring the surface layers is denoted by Z μm.

In a specific aspect of the interlayer film according to the present invention, the thickness of the other end is larger than the thickness of the one end.

In a specific aspect of the interlayer film according to the present invention, the interlayer film has a region where the first resin layer and the second resin layer are alternately laminated in the thickness direction.

In a specific aspect of the interlayer film according to the present invention, the surface layer is the second resin layer.

In a specific aspect of the interlayer film according to the present invention, when a thickness of the interlayer film is denoted by X μm, and a thickness by one layer of surface layers is denoted by $Y_2$ μm, the interlayer film has a region where $Y_2/X$ is 0.3 or less.

In a specific aspect of the interlayer film according to the present invention, an average thickness of each surface layer in a region from a position of 100 mm to a position of 400 mm from the one end toward the other end is less than 300 μm.

In a specific aspect of the interlayer film according to the present invention, when an average thickness of a surface layer in a region from a position of 50 mm to a position of 150 mm from the one end toward the other end is denoted by $Y_3$ μm, and an average thickness of a surface layer in a region from a position of 50 mm to a position of 150 mm from the other end toward the one end is denoted by $Y_4$ μm, $Y_4/Y_1$ is 2.5 or less.

In a specific aspect of the interlayer film according to the present invention, when an average thickness of a layer other than surface layers in a region from a position of 50 mm to a position of 150 mm from the one end toward the other end is denoted by $Y_5$ μm, and an average thickness of a layer other than surface layers in a region from a position of 50 mm to a position of 150 mm from the other end toward the one end is denoted by $Y_6$ μm, $Y_6/Y_5$ is 2.5 or less.

In a specific aspect of the interlayer film according to the present invention, the interlayer film has a region for display corresponding to a display region of a head-up display, and an average thickness of each surface layer in the region for display is less than 300 μm.

In a specific aspect of the interlayer film according to the present invention, the interlayer film has a region where $T_2/T_1$ is 1 or more when a total thickness of the first resin layers is denoted by $T_1$ μm, and a total thickness of the second resin layers is denoted by $T_2$ μm.

According to a broad aspect of the present invention, there is provided a laminated glass including a first lamination glass member, a second lamination glass member, and the above-described interlayer film for laminated glass, the interlayer film for laminated glass being arranged between the first lamination glass member and the second lamination glass member.

Effect of the Invention

The interlayer film according to the present invention has one end and the other end being on an opposite side of the one end, and the one end has a thickness of 1.05 mm or less. The interlayer film according to the present invention includes a first resin layer having a glass transition temperature of less than 15° C., and a second resin layer having a glass transition temperature of 15° C. or more, and has a region where a total number of laminated layers of the first resin layer and the second resin layer in the thickness direction is five or more. In the interlayer film according to the present invention, when a thickness by one layer of surface layers is denoted by $Y_1$ μm, and a thickness by one layer of layers neighboring the surface layers is denoted by Z μm in the region of five or more layers, $Y_1/Z$ is 1.01 or more. Since the interlayer film according to the present invention is provided with the above configuration, it is possible to prevent the winding core from falling off the roll body of the interlayer film.

BRIEF DESCRIPTION OF DRAWINGS

FIGS. 1(*a*) and (*b*) are a sectional view and a front view, respectively, schematically showing an interlayer film for laminated glass, in accordance with a first embodiment of the present invention.

FIG. 2 is a sectional view schematically showing an interlayer film for laminated glass in accordance with a second embodiment of the present invention.

FIG. 3 is a sectional view schematically showing an interlayer film for laminated glass in accordance with a third embodiment of the present invention.

FIG. 4 is a sectional view schematically showing an interlayer film for laminated glass in accordance with a fourth embodiment of the present invention.

FIG. 5 is a sectional view schematically showing an example of laminated glass prepared with the interlayer film for laminated glass shown in FIG. 1.

MODES FOR CARRYING OUT THE INVENTION

Hereinafter, the details of the present invention will be described.

The interlayer film for laminated glass (in the present specification, sometimes abbreviated as "interlayer film") according to the present invention is used for laminated glass.

The interlayer film has one end and the other end being on an opposite side of the one end. The one end and the other end are end parts of both sides facing each other in the interlayer film. In the interlayer film, the thickness of the one end is 1.05 mm or less.

The interlayer film includes a first resin layer having a glass transition temperature of less than 15° C., and a second resin layer having a glass transition temperature of 15° C. or more, and has a region where a total number of laminated layers of the first resin layer and the second resin layer in the thickness direction is five or more.

In the interlayer film, when a thickness by one layer of surface layers is denoted by $Y_1$ μm, and a thickness by one layer of layers neighboring the surface layers is denoted by Z μm in the region of five or more layers, $Y_1/Z$ is 1.01 or more.

Since the interlayer film according to the present invention is provided with the above configuration, it is possible to prevent the winding core from falling off the roll body of the interlayer film. When the interlayer film according to the present invention is a wedge-like interlayer film in which the thickness of the other end is larger than the thickness of the one end, a crease can be prevented from remaining while the aforementioned effect is achieved. In the interlayer film according to the present invention, since the thickness of the one end is 1.05 mm or less, the thickness by one layer of the first resin layers and the thickness by one layer of the second resin layers are relatively small. Therefore, in the present invention, it is possible to enhance the flexibility of the interlayer film, and it is possible to wind the interlayer film with a high tension in preparing a roll body. Therefore, it is possible to prevent the core from falling off the roll body. In the case where the interlayer film according to the present invention is the wedge-like interlayer film, even if the interlayer film is stored in a state of a roll body such that the other end side is downside and the one end side is upside, and a crease is generated due to buckling, the height of the crease can be made small when the interlayer film is cut out from the roll body and the interlayer film is left to stand on a flat part.

In a conventional wedge-like interlayer film in which the thickness of the other end is larger than the thickness of the one end, the degree of shrinkage can sometimes differ between the one end side and the other end side, and the winding length can sometimes differ between the one end side and the other end side in making a roll body. Therefore, in a conventional wedge-like interlayer film, the other end side having a larger thickness fails to follow the roll in unwinding the interlayer film from the roll body, and the temperature of the interlayer film sometimes cannot be raised uniformly in the direction connecting the one end and the other end of the interlayer film. In contrast, in the interlayer film according to the present invention, since the degree of shrinkage can be made small, the difference in winding length between the one end side and the other end side can be controlled to small in making a roll body, and thus the temperature of the interlayer film can be raised uniformly.

Also, since the interlayer film according to the present invention includes the first resin layer having a glass transition temperature of less than 15° C., it is possible to enhance the sound insulating property effectively.

The interlayer film has a region where a total number of laminated layers of the first resin layer and the second resin layer in the thickness direction is five or more. In the region, the total number of laminated layers of the first resin layer and the second resin layer in the thickness direction may be five, may be six or more, may be seven or more, may be eight or more, may be nine or more, and may be 10 or more. In the region, the total number of laminated layers of the first resin layer and the second resin layer in the thickness direction may be 20 or less, may be 15 or less, may be 10 or less, may be nine or less, may be eight or less, and may be six or less. In the region, the total number of laminated layers of the first resin layer and the second resin layer in the thickness direction is preferably five, seven or 11, more preferably five or seven, further preferably five. In this case, it is possible to effectively suppress generation of a flow mark. Especially when the total number of laminated layers of the first resin layer and the second resin layer in the thickness direction is five, it is possible to suppress generation of a flow mark more effectively.

The interlayer film may have the region where the total number of laminated layers of the first resin layer and the second resin layer in the thickness direction is five or more, in a part of the interlayer film or in the entire interlayer film. The structure of the interlayer film may partially vary.

In 100% of the plane area of the interlayer film, the area of the region where the total number of laminated layers of the first resin layer and the second resin layers in the thickness direction is five or more is preferably 1% or more, more preferably 2% or more, further preferably 3% or more, especially preferably 5% or more. In 100% of the plane area of the interlayer film, the area of the region where the total number of laminated layers of the first resin layer and the second resin layer in the thickness direction is five or more may be 50% or more, 60% or more, 70% or more, or 80% or more. In 100% of the plane area of the interlayer film, the area of the region where the total number of laminated layers of the first resin layer and the second resin layer in the thickness direction is five or more is 100% or less.

The interlayer film includes at least one first resin layer having a glass transition temperature of less than 15° C. The interlayer film may include only one first resin layer, two first resin layers, two or more first resin layers, three first resin layers, or three or more first resin layers.

The interlayer film includes at least one second resin layer having a glass transition temperature of 15° C. or more. The interlayer film may include only one second resin layer, two second resin layers, two or more second resin layers, three second resin layers, or three or more second resin layers.

The first resin layer has a glass transition temperature of less than 15° C. The glass transition temperature of the first resin layer is preferably −20° C. or more, more preferably −15° C. or more, further preferably −10° C. or more, and is preferably 10° C. or less, more preferably 5° C. or less, further preferably 0° C. or less. When the glass transition temperature is the above lower limit or more and the above upper limit or less, it is possible to further enhance the sound insulating property of the laminated glass.

The second resin layer has a glass transition temperature of 15° C. or more. The glass transition temperature of the second resin layer is preferably 20° C. or more, more preferably 25° C. or more, further preferably 30° C. or more, and is preferably 50° C. or less, more preferably 45° C. or less, further preferably 40° C. or less. When the glass transition temperature is the above lower limit or more and the above upper limit or less, it is possible to use the interlayer film without impairing the handleability of the interlayer film while further enhancing the sound insulating property of laminated glass.

An absolute value of difference between the glass transition temperature of the first resin layer and the glass transition temperature of the second resin layer is preferably 10° C. or more, more preferably 15° C. or more, and is preferably 70° C. or less, more preferably 65° C. or less. When the absolute value of difference is the above lower limit or more and the above upper limit or less, it is possible to further enhance the sound insulating property of the laminated glass.

The glass transition temperature is determined by measurement of viscoelasticity. The viscoelasticity measurement is conducted specifically in the following manner.

The test piece is stored for 12 hours in an environment of a room temperature of 23±2° C. and a humidity of 25±5%. Then, viscoelasticity is measured using a viscoelasticity measuring device "ARES-G2" available from TA Instruments. A parallel plate with a diameter of 8 mm is used as a jig, and the measurement is performed in a shearing mode under the condition in which the temperature is decreased from 100° C. to −20° C. at a temperature decreasing rate of 3° C./minute and under the condition of a frequency of 1 Hz and a strain of 1%. In the measurement results obtained, the peak temperature of the loss tangent is defined as the glass transition temperature Tg (° C.).

The viscoelasticity measurement may be conducted using an interlayer film itself. In this case, a peak of tan δ and the like originated in each layer may be read from the measurement result. Layers of the interlayer film may be delaminated from each other, and the glass transition temperature of the layer to be measured may be measured. In the case of a laminated glass, after cooling the laminated glass with liquid nitrogen or the like, the lamination glass member and the interlayer film are delaminated, and the viscoelasticity measurement may be conducted using the delaminated interlayer film.

The plurality of first resin layers in the interlayer film need not have the same glass transition temperature as long as the first resin layers have the above specific glass transition temperature. Also, the plurality of second resin layers in the interlayer film need not have the same glass transition temperature as long as the second resin layers have the above specific glass transition temperature.

From the viewpoint of exerting the effect of the present invention more effectively, it is preferred that the interlayer film have a region where the first resin layer and the second resin layer are laminated alternately in the thickness direction. From the viewpoint of exerting the effect of the present invention still more effectively, it is preferred that the first resin layer and the second resin layer be laminated alternately in the thickness direction.

The number the first resin layers, and the number of the second resin layers may be the same as or different from each other. From the viewpoint of exerting the effect of the present invention more effectively, it is preferred that the number of the first resin layers be smaller than the number of the second resin layers.

Since the interlayer film has a five or more-layer structure, the interlayer film has two surface layers (first surface layer and second surface layer).

The interlayer film may include the first resin layer as the surface layer, or may include the second resin layer as the surface layer. The interlayer film may include the first resin layer as the first surface layer, and may include the second resin layer as the second surface layer.

It is preferred that the surface layer be the second resin layer. In this case, it is possible to exert the effect of the present invention still more effectively, and it is possible to further enhance the sound insulating property and the penetration resistance of laminated glass, and it is possible to effectively suppress the optical strain. Also in this case, it is possible to achieve excellent deaeration in preparation of laminated glass.

In the region of five or more layers in the interlayer film, a thickness by one layer of surface layers is denoted by $Y_1$ μm, and a thickness by one layer of layers neighboring the surface layers is denoted by Z μm. $Y_1$ is a thickness by one layer of surface layers at the predetermined position in the region of five or more layers, and Z is a thickness by one layer of layers neighboring the surface layers at the same position as the predetermined position.

In the interlayer film, $Y_1/Z$ is 1.01 or more, preferably 1.1 or more, more preferably 1.2 or more, and is preferably 15 or less, more preferably 14 or less. When the $Y_1/Z$ is the above lower limit or more and the above upper limit or less, it is possible to prevent the core from falling off the roll body. The relationship of $Y_1/Z$ is satisfied in at least one of the first surface layer and the second surface layer, preferably in both of the first surface layer and the second surface layer. Each preferred form regarding the surface layer described in the present specification is satisfied in at least one of the first surface layer and the second surface layer, and preferably in both of the first surface layer and the second surface layer.

The thickness of the interlayer film is denoted by X μm and the thickness by one layer of the surface layers is denoted by $Y_1$ μm. X is a thickness of the interlayer film at a predetermined position, and $Y_2$ is a thickness by one layer of the surface layers at the same position as the predetermined position. $Y_1$ and $Y_1$ may be the same as or different from each other.

It is preferred that the interlayer film have a region where the value of $Y_2/X$ is 0.3 or less (hereinafter, sometimes described as region A). That is, it is preferred that the interlayer film have a region where a ratio of the thickness by one layer of the surface layers ($Y_2$) to the thickness of the interlayer film (X) is 0.3 or less (region A). The relationship of $Y_2/X$ is satisfied preferably in at least one of the first surface layer and the second surface layer, and more preferably in both of the first surface layer and the second surface layer.

In the region A, the value of $Y_2/X$ is preferably 0.01 or more, more preferably 0.05 or more, and is preferably 0.29 or less, preferably 0.28 or less. When the value of $Y_2/X$ is the above lower limit or more, it is possible to further enhance the sound insulating property of laminated glass. When the value of $Y_2/X$ is the above upper limit or less, it is possible to further enhance the penetration resistance of laminated glass, and it is possible to effectively suppress the optical strain. When the value of $Y_2/X$ is the above lower limit or more and the above upper limit or less, it is possible to exert the effect of the present invention more effectively. The relationship of $Y_2/X$ is satisfied preferably in at least one of the first surface layer and the second surface layer, and more preferably in both of the first surface layer and the second surface layer.

It is preferred that the region A exist from the position of 0 mm to the position of 1000 mm from the one end toward the other end, and it is more preferred that the region A exist from the position of 50 mm to the position of 950 mm from the one end toward the other end (in this case, the region A may exist at other location). In this case, it is possible to exert the effect of the present invention still more effectively, and it is possible to further enhance the sound insulating property and the penetration resistance of laminated glass, and it is possible to effectively suppress the optical strain.

A distance between one end and the other end of the interlayer film is denoted by L. It is preferred that the region A exist from the position of 0 L to the position of 1.0 L from the one end toward the other end. It is more preferred that the region A exist from the position of 0 L to the position of 0.99 L from the one end toward the other end, and it is further preferred that the region A exist from the position of 0 L to the position of 0.95 L from the one end toward the other end (in this case, the region A may exist at other location). In this case, it is possible to exert the effect of the present invention still more effectively, and it is possible to further enhance the sound insulating property and the penetration resistance of laminated glass, and it is possible to effectively suppress the optical strain.

An average thickness of a surface layer in the region from the position of 50 mm to the position of 150 mm from the one end toward the other end is denoted by Y; μm, and an average thickness of a surface layer in the region from the position of 50 mm to the position of 150 mm from the other end toward the one end is denoted by $Y_4$ μm. $Y_3$ may be the same as or different from $Y_1$. $Y_3$ may be the same as or different from $Y_2$.

From the viewpoint of exerting the effect of the present invention still more effectively, in the interlayer film, $Y_4/Y_1$ is preferably 0.3 or more, more preferably 0.5 or more, still more preferably 0.7 or more, further preferably 0.9 or more. From the viewpoint of exerting the effect of the present invention still more effectively, in the interlayer film, $Y_4/Y_5$ is preferably 2.5 or less, more preferably 2.3 or less, still more preferably 2.0 or less, further preferably 1.7 or less, still further preferably 1.5 or less, especially preferably 1.3 or less, most preferably 1.1 or less. The relationship of $Y_4/Y_3$ is satisfied preferably in at least one of the first surface layer and the second surface layer, and more preferably in both of the first surface layer and the second surface layer.

An average thickness of a layer other than surface layers in the region from the position of 50 mm to the position of 150 mm from the one end toward the other end is denoted by $Y_5$ μm, and an average thickness of a layer other than surface layers in the region from the position of 50 mm to the position of 150 mm from the other end toward the one end is denoted by $Y_5$ μm.

From the viewpoint of exerting the effect of the present invention still more effectively, in the interlayer film, $Y_6/Y_5$ is preferably 0.3 or more, more preferably 0.5 or more, still more preferably 0.7 or more, further preferably 0.9 or more. From the viewpoint of exerting the effect of the present invention still more effectively, in the interlayer film, $Y_6/Y_5$ is preferably 2.5 or less, more preferably 2.3 or less, still more preferably 2.0 or less, further preferably 1.7 or less, still further preferably 1.5 or less, especially preferably 1.3 or less, most preferably 1.1 or less. The relationship of $Y_6/Y_5$ is satisfied preferably in at least one layer of layers other than surface layers, and more preferably in all of layers other than surface layers.

From the viewpoint of exerting the effect of the present invention still more effectively, in the interlayer film, it is especially preferred that $Y_4/Y_5$ be 2.5 or less, and $Y_1/Y_5$ be 2.5 or less.

The interlayer film is used, for example, in a laminated glass that is a head-up display. When the interlayer film is used in a laminated glass that is a head-up display, and the interlayer film has a region for display corresponding to a display region of the head-up display. The region for display is a region capable of favorably displaying information.

In the interlayer film, it is preferred that an average thickness of each surface layer in the region from the position of 100 mm to the position of 400 mm from the one end toward the other end (hereinafter, sometimes described as a region B) be less than 300 μm. In the interlayer film, it is preferred that an average thickness of each surface layer in the region for display be less than 300 μm. In this case, it is possible to exert the effect of the present invention still more effectively, and it is possible to further enhance the sound insulating property and the penetration resistance of laminated glass, and it is possible to effectively suppress the optical strain. The value of the average thickness of a surface layer in the region for display is satisfied preferably in at least one of the first surface layer and the second surface layer, and more preferably in both of the first surface layer and the second surface layer.

The average thickness of each surface layer in the region B or in the region for display is preferably 10 μm or more, more preferably 20 μm or more, still more preferably 100 μm or more, further preferably 180 μm or more, and is preferably 350 μm or less, more preferably 295 μm or less, still more preferably 290 μm or less. When the average thickness of a surface layer is the above lower limit or more and the above upper limit or less, it is possible to exert the effect of the present invention still more effectively, and it is possible to further enhance the sound insulating property and the penetration resistance of laminated glass, and it is possible to effectively suppress the optical strain. The value of the average thickness of the surface layer is satisfied preferably in at least one of the first surface layer and the second surface layer, and more preferably in both of the first surface layer and the second surface layer.

A total thickness of the first resin layers is denoted by $T_1$ μm, and a total thickness of the second resin layers is denoted by $T_2$ μm. $T_1$ is the thickness of the first resin layers at a predetermined position, and $T_2$ is the thickness of the second resin layers at the same position as the predetermined position.

It is preferred that the interlayer film have a region where the value of $T_2/T_1$ is 1 or more (hereinafter, sometimes described as region C). That is, it is preferred that the interlayer film have a region where a ratio of the total thickness of the second resin layers ($T_2$) to the total thickness of the first resin layers ($T_1$) is 1 or more (region C).

In the region C, the value of $T_2/T_1$ is preferably 1.01 or more, more preferably 1.02 or more, and is preferably 40 or less, more preferably 38 or less. When the value of $T_2/T_1$ is the above lower limit or more, it is possible to further enhance the sound insulating property of laminated glass. When the value of $T_2/T_1$ is the above upper limit or less, it is possible to further enhance the penetration resistance of laminated glass, and it is possible to effectively suppress the optical strain. When the value of $T_2/T_1$ is the above lower limit or more and the above upper limit or less, it is possible to exert the effect of the present invention more effectively.

It is preferred that the region C exist at least from the position of 50 mm to the position of 1000 mm from the one end toward the other end, and it is more preferred that the region A exist at least from the position of 50 mm to the position of 950 mm from the one end toward the other end. In this case, it is possible to exert the effect of the present invention still more effectively, and it is possible to further enhance the sound insulating property and the penetration resistance of laminated glass, and it is possible to effectively suppress the optical strain.

A distance between one end and the other end of the interlayer film is denoted by L. It is preferred that the region C exist at least from the position of 0 L to the position of 0.99 L from the one end toward the other end, and it is more preferred that the region C exist at least from the position of 0 L to the position of 0.95 L from the one end toward the other end. In this case, it is possible to exert the effect of the present invention still more effectively, and it is possible to further enhance the sound insulating property and the penetration resistance of laminated glass, and it is possible to effectively suppress the optical strain.

The one end of the interlayer film has a thickness of 1.05 mm or less. The thickness of the one end of the interlayer film is preferably 0.1 mm or more, more preferably 0.2 mm or more, further preferably 0.3 mm or more, especially preferably 0.4 mm or more, and is preferably 1.04 mm or less, more preferably 1.03 mm or less, further preferably 1.0 mm or less. When the thickness of the one end is the above lower limit or more and the above upper limit or less, it is possible to exert the effect of the present invention more effectively.

The thickness of the other end of the interlayer film is preferably larger than the thickness of the one end, and more preferably larger by 0.01 mm or more, further preferably larger by 0.05 mm or more, especially preferably larger by 0.1 mm or more. The thickness of the other end of the interlayer film is preferably larger than the thickness of the one end by 5 mm or less, more preferably larger by 4.8 mm or less, and further preferably larger by 4.6 mm or less. When the thickness of the other end is the above lower limit or more and the above upper limit or less, it is possible to exert the effect of the present invention more effectively.

The maximum thickness of the interlayer film is preferably 0.15 mm or more, more preferably 0.25 mm or more, further preferably 0.5 mm or more, especially preferably 0.8 mm or more, and is preferably 4 mm or less, more preferably 3.8 mm or less, further preferably 3.6 mm or less.

A distance between one end and the other end of the interlayer film is denoted by L. It is preferred that the interlayer film have a minimum thickness in a region from the position of 0 L to the position of 0.2 L from the one end toward the other end, and have a maximum thickness in a region from the position of 0 L to the position of 0.2 L from the other end toward the one end. It is more preferred that the interlayer film have a minimum thickness in a region from the position of 0 L to the position of 0.1 L from the one end toward the other end, and have a maximum thickness in a region from the position of 0 L to the position of 0.1 L from the other end toward the one end. It is preferred that the interlayer film have a minimum thickness at the one end and have a maximum thickness at the other end. The maximum thickness is the thickness of the part having the maximum thickness. The minimum thickness is the thickness of the part having a minimum thickness.

The interlayer film may have a uniform-thickness part. The uniform-thickness part means that the variation in thickness does not exceed 10 μm per a distance range of 10 cm in the direction connecting the one end and the other end of the interlayer film. Therefore, the uniform-thickness part refers to the part where the variation in thickness does not exceed 10 μm per a distance range of 10 cm in the direction connecting the one end and the other end of the interlayer film. To be more specific, the uniform-thickness part refers to the part where the thickness does not vary at all in the direction connecting the one end and the other end of the interlayer film, or the thickness varies by 10 μm or less per a distance range of 10 cm in the direction connecting the one end and the other end of the interlayer film.

From the viewpoint of the practical aspect and the viewpoint of sufficiently enhancing the adhesive force and the penetration resistance, the maximum thickness of a surface layer in the interlayer film is preferably 20 μm or more, more preferably 25 μm or more, further preferably 50 μm or more, and is preferably 2000 μm or less, more preferably 1800 μm or less.

From the viewpoint of the practical aspect and the viewpoint of sufficiently enhancing the penetration resistance, the maximum thickness of the layer (intermediate layer) arranged between two surface layers in the interlayer film is preferably 60 μm or more, more preferably 80 μm or more, and is preferably 4980 μm or less, more preferably 4800 μm or less.

The distance L between one end and the other end of the interlayer film is preferably 3 m or less, more preferably 2 m or less, especially preferably 1.5 m or less, and preferably 0.5 m or more, more preferably 0.8 m or more, and especially preferably 1 m or more.

From the viewpoint of better display, it is preferred that the interlayer film have a portion with a wedge-like sectional shape in the thickness direction. It is preferred that the sectional shape in the thickness direction of the region for display be a wedge-like shape.

In order to suppress double images, the wedge angle θ of the interlayer film can be appropriately set according to the fitting angle of the laminated glass. The wedge angle θ is a wedge angle of the interlayer film as a whole.

The wedge angle θ of the interlayer film is an interior angle formed at the intersection point between a straight line connecting surface parts on the one side of the interlayer film (first surface part) of the maximum thickness part and the minimum thickness part in the interlayer film, and a straight line connecting surface parts of the other side of the interlayer film (second surface part) of the maximum thickness part and the minimum thickness part in the interlayer film.

When there are a plurality of maximum thickness parts, there are a plurality of minimum thickness parts, the maximum thickness part is located in a certain region, or the minimum thickness part is located in a certain region, the maximum thickness part and the minimum thickness part for determining the wedge angle θ are selected so that the wedge angle θ to be determined is the maximum.

From the viewpoint of suppressing double images more effectively, the wedge angle θ of the interlayer film is preferably 0.05 mrad or more, more preferably 0.1 mrad (0.00575 degrees) or more, further preferably 0.2 mrad (0.0115 degrees) or more. When the wedge angle θ is the above lower limit or more, it is possible to obtain laminated glass suited for cars such as a truck or a bus in which the attachment angle of the windshield is large.

From the viewpoint of suppressing double images more effectively, the wedge angle θ of the interlayer film is preferably 2 mrad (0.1146 degrees) or less, and more preferably 0.7 mrad (0.0401 degrees) or less. When the wedge angle θ is the above upper limit or less, it is possible to obtain laminated glass suited for cars such as a sports car in which the attachment angle of the windshield is small.

As a measuring device for use for measurement of a wedge angle (θ) of the interlayer film, and a thickness of the interlayer film, a contact type thickness meter "TOF-4R" (available from Yamabun Electronics Co., Ltd.) or the like can be recited.

Measurement of the thickness of the interlayer film is conducted such that the distance is the shortest from the one end toward the other end by using the above-described measuring device at a film conveyance speed of 2.15 mm/minute to 2.25 mm/minute.

Examples of the measuring device for use in measurement of thickness of each layer of the interlayer film include "SE-3000" (available from SELMIC Corporation) and the like.

Thickness of each layer of the interlayer film can be measured in the following manner. The interlayer film is cut at a measuring position in the thickness direction with a razor, a cutter, or the like. After observing the cut plane of the interlayer film with the aforementioned measuring device, thickness of each layer is measured by means of calculation software in the attached software.

As a measuring device for use for measurement of a wedge angle (θ) of the interlayer film, a thickness of the interlayer film, and a thickness of each layer of the interlayer film after the interlayer film is made into laminated glass, a non-contact type multilayer film thickness measuring device "OPTIGAUGE" (available from Lumetrics, Inc.) or the like can be recited. When the measuring device is used, it is possible to measure the thickness of the interlayer film while the interlayer film is in the laminated glass.

The interlayer film is suitably used for laminated glass serving as a head-up display (HUD). It is preferred that the interlayer film be an interlayer film for HUD. It is preferred that the interlayer film have a region for display corresponding to a display region of HUD.

From the viewpoint of suppressing double images more effectively, it is preferred that the interlayer film have the region for display in a region between a position of 6 cm from the one end toward the other end of the interlayer film and a position of 63.8 cm from the one end toward the other end.

From the viewpoint of suppressing double images more effectively, it is more preferred that the interlayer film have the region for display in a region between a position of 8 cm from the one end toward the other end of the interlayer film and a position of 61.8 cm from the one end toward the other end.

From the viewpoint of suppressing double images more effectively, it is still more preferred that the interlayer film have the region for display in a region between a position of 9 cm from the one end toward the other end of the interlayer film and a position of 60.8 cm from the one end toward the other end.

From the viewpoint of suppressing double images more effectively, it is further preferred that the interlayer film have the region for display in a region between a position of 9.5 cm from the one end toward the other end of the interlayer film and a position of 60.3 cm from the one end toward the other end.

From the viewpoint of suppressing double images more effectively, it is especially preferred that the interlayer film have the region for display in a region between a position of 10 cm from the one end toward the other end of the interlayer film and a position of 59.3 cm from the one end toward the other end.

The region for display may exist in a part or the whole of the region up to the aforementioned position (for example, 63.8 mm) from the one end toward the other end of the interlayer film. The region for display may exist in a size of about 30 cm in the direction connecting the one end and the other end.

From the viewpoint of suppressing double images effectively, it is preferred that the interlayer film have a portion with a sectional shape in the thickness direction of a wedge-like shape in the region between a position of 6 cm from the one end toward the other end of the interlayer film and a position of 63.8 cm from the one end toward the other end.

From the viewpoint of suppressing double images effectively, it is more preferred that the interlayer film have a portion with a sectional shape in the thickness direction of a wedge-like shape in the region between a position of 8 cm from the one end toward the other end of the interlayer film and a position of 61.8 cm from the one end toward the other end.

From the viewpoint of suppressing double images effectively, it is still more preferred that the interlayer film have a portion with a sectional shape in the thickness direction of a wedge-like shape in the region between a position of 9 cm from the one end toward the other end of the interlayer film and a position of 60.8 cm from the one end toward the other end.

From the viewpoint of suppressing double images effectively, it is further preferred that the interlayer film have a portion with a sectional shape in the thickness direction of a wedge-like shape in the region between a position of 9.5 cm from the one end toward the other end of the interlayer film and a position of 60.3 cm from the one end toward the other end.

From the viewpoint of suppressing double images effectively, it is especially preferred that the interlayer film have a portion with a sectional shape in the thickness direction of a wedge-like shape in the region between a position of 10 cm from the one end toward the other end of the interlayer film and a position of 59.8 cm from the one end toward the other end.

The portion with a sectional shape in the thickness direction of a wedge-like shape may exist in a part or the whole of the region up to the aforementioned position (for example, 63.8 mm) from the one end toward the other end. The portion with a sectional shape in the thickness direction of a wedge-like shape may exist in a size of about 30 cm in the direction connecting the one end and the other end.

The interlayer film may have a shading region. The shading region may be separate from the region for display.

The shading region is provided so as to prevent a driver from feeling glare while driving, for example, by sunlight or outdoor lighting. The shading region can be provided so as to impart the heat shielding property. It is preferred that the shading region be located in an edge portion of the interlayer film. It is preferred that the shading region be belt-shaped.

In the shading region, a coloring agent or a filler may be used so as to change the color and the visible light transmittance. The coloring agent or the filler may be contained in a partial region in the thickness direction of the interlayer film or may be contained in the entire region in the thickness direction of the interlayer film.

From the viewpoint of providing better display, and further broadening the field of view, the visible light transmittance of the region for display is preferably 80% or more, more preferably 88% or more, further preferably 90% or more. It is preferred that the visible light transmittance of the region for display be higher than the visible light transmittance of the shading region. The visible light transmittance of the region for display may be lower than the visible light transmittance of the shading region. The visible light transmittance of the region for display is higher than the visible light transmittance of the shading region preferably by 50% or more, more preferably by 60% or more.

When the visible light transmittance varies in the interlayer film of each of the region for display and the shading region, the visible light transmittance is measured at the center position of the region for display and at the center position of the shading region.

The visible light transmittance at a wavelength ranging from 380 nm to 780 nm of the obtained laminated glass can be measured by using a spectrophotometer ("U-4100" available from Hitachi High-Tech Corporation) in conformity with JIS R3211:1998. As the glass plate, it is preferred to use clear glass having a thickness of 2 mm.

It is preferred that the region for display have a length direction and a width direction. For excellent versatility of the interlayer film, it is preferred that the width direction of the region for display be the direction connecting the one end and the other end. It is preferred that the region for display be belt-shaped.

It is preferred that the interlayer film have an MD direction and a TD direction. For example, the interlayer film is obtained by melt extrusion molding. The MD direction is a flow direction of an interlayer film at the time of producing the interlayer film. The TD direction is a direction orthogonal to the flow direction of an interlayer film at the time of producing the interlayer film and a direction orthogonal to the thickness direction of the interlayer film. It is preferred that the one end and the other end be located at the opposite sides of the TD direction.

Hereinafter, specific embodiments of the present invention will be described with reference to the drawings.

FIGS. 1(*a*) and (*b*) are a sectional view and a front view, respectively, schematically showing an interlayer film for laminated glass in accordance with a first embodiment of the present invention. FIG. 1(*a*) is a sectional view along the line I-I in FIG. 1(*b*). The size and dimension of the interlayer film in FIG. 1 and later described drawings are appropriately changed from the actual size and shape for convenience of illustration.

In FIG. 1(*a*), a section in the thickness direction of an interlayer film 10 is shown. In this connection, in FIG. 1(*a*) and later described drawings, for convenience of illustration, the thicknesses of an interlayer film and respective layers constituting the interlayer film and the wedge angle (θ) are shown so as to be different from actual thicknesses thereof and an actual wedge angle.

The interlayer film 10 is used for obtaining laminated glass. The interlayer film 10 is an interlayer film for laminated glass. The interlayer film 10 includes first resin layers 11, 12 and second resin layers 21, 22, 23. The first resin layers 11, 12 are layers having a glass transition temperature of less than 15° C. The second resin layers 21, 22, 23 are layers having a glass transition temperature of 15° C. or more. The interlayer film 10 includes two first resin layers and three second resin layers. In the interlayer film 10, the total number of laminated layers of the first resin layer and the second resin layer in the thickness direction is five. In the interlayer film 10, the first resin layer and the second resin layer are alternately laminated in the thickness direction.

The interlayer film 10 includes the second resin layer 21 and the second resin layer 23 as surface layers. The interlayer film 10 includes the first resin layer 11, the second resin layer 22, and the first resin layer 12 as intermediate layers. The first resin layer 11 is arranged on a first surface side of the second resin layer 22 to be layered thereon. The first resin layer 12 is arranged on a second surface side opposite to the first surface of the second resin layer 22 to be layered thereon. The second resin layer 21 is arranged on a surface side opposite to the second resin layer 22 of the first resin layer 11 to be layered thereon. The second resin layer 23 is arranged on a surface side opposite to the second resin layer 22 of the first resin layer 12 to be layered thereon.

The interlayer film 10 has one end 10*a* and the other end 10*b* being on an opposite side of the one end 10*a*. The one end 10*a* and the other end 10*b* are end parts of both sides facing each other. The sectional shape in the thickness direction of each of the first resin layers 11, 12, and the second resin layers 21, 22, 23 is a wedge-like shape. The thickness of each of the first resin layers 11, 12, and the second resin layers 21, 22, 23 is larger in the other end 10*b* side than in the one end 10*a* side. Accordingly, the thickness of the other end 10*b* of the interlayer film 10 is larger than the thickness of the one end 10*a* thereof. The interlayer film 10 has a region being thin in thickness and a region being thick in thickness.

The interlayer film 10 has a region where the thickness increases from the one end 10*a* side to the other end 10*b* side. In the interlayer film 10, the increment of the thickness is constant from the one end 10*a* side to the other end 10*b* side in the region where the thickness increases.

The interlayer film 10 has a region for display R1 corresponding to a display region of a head-up display. The interlayer film 10 has a surrounding region R2 neighboring the region for display R1. The interlayer film 10 has a shading region R3 that is separate from the region for display R1. The shading region R3 is located in an edge portion of the interlayer film 10.

The interlayer film has the shape shown in FIG. 1(*a*) and may have a six or more-layer structure. The interlayer film has the shape shown in FIG. 1(*a*), and may lack a region for display and may lack a shading region. Also, the interlayer film has the shape shown in FIG. 1(*a*) and may have a portion where the first resin layer and the second resin layer are not alternately laminated. For example, the interlayer film may have a lamination structure of second resin layer/first resin layer/first resin layer/first resin layer/second resin layer. The interlayer film has the shape shown in FIG. 1(*a*), and the first resin layer may be a surface layer. Also, the interlayer film has the shape shown in FIG. 1(*a*) in which the sectional shape in the thickness direction of all the layers of the first resin layers may be a rectangular shape, and the sectional shape in the thickness direction of all the layers of the second resin layers may be a rectangular shape. Also, the interlayer film has the shape shown in FIG. 1(*a*) in which the sectional shape in the thickness direction of at least one layer of the first resin layers may be a rectangular shape, and the sectional shape in the thickness direction of at least one layer of the second resin layers may be a rectangular shape.

FIG. 2 is a sectional view schematically showing an interlayer film for laminated glass in accordance with a second embodiment of the present invention. In FIG. 2, a section in the thickness direction of an interlayer film 10A is shown.

The interlayer film 10A shown in FIG. 2 includes first resin layers 11A, 12A, and second resin layers 21A, 22A, 23A. The first resin layers 11A, 12A are layers having a glass transition temperature of less than 15° C. The second resin layers 21A, 22A, 23A are layers having a glass transition temperature of 15° C. or more. The interlayer film 10 and the interlayer film 10A are different from each other in the increment of the thickness in the region where the thickness increases.

The interlayer film 10A has one end 10*a* and the other end 10*b* being on an opposite side of the one end 10*a*. The one end 10*a* and the other end 10*b* are end parts of both sides facing each other. The sectional shape in the thickness direction of each of the first resin layers 11A, 12A, and the second resin layers 21A, 22A, 23A is a wedge-like shape. The thickness of each of the first resin layers 11A, 12A, and the second resin layers 21A, 22A, 23A is larger in the other end 10*b* side than in the one end 10*a* side. Accordingly, the thickness of the other end 10*b* of the interlayer film 10A is larger than the thickness of the one end 10*a* thereof. The interlayer film 10A has a region being thin in thickness and a region being thick in thickness.

The interlayer film 10A has a region where the thickness increases from the one end 10*a* side to the other end 10*b* side. The interlayer film 10A has a portion where the increment of the thickness increases from the one end 10*a* side to the other end 10*b* side in the region where the thickness increases. The interlayer film 10A has a region with a wedge-like sectional shape in the thickness direction. The interlayer film 10A has a portion where the wedge angle increases from the one end side to the other end side in the region with a wedge-like sectional shape in the thickness direction.

The interlayer film 10A has a region for display R1 corresponding to a display region of a head-up display. The interlayer film 10A has a surrounding region R2 neighboring the region for display Rb. The interlayer film 10A has a shading region R3 that is separate from the region for display R1. The shading region R3 is located in an edge portion of the interlayer film 10A.

The interlayer film has the shape shown in FIG. 2 and may have a six or more-layer structure. The interlayer film has the shape shown in FIG. 2, and may lack a region for display and may lack a shading region. Also, the interlayer film has the shape shown in FIG. 2 and may have a portion where the first resin layer and the second resin layer are not alternately laminated. The interlayer film has the shape shown in FIG. 2, and the first resin layer may be a surface layer. Also, the interlayer film has the shape shown in FIG. 2 in which the sectional shape in the thickness direction of all the layers of the first resin layers may be a rectangular shape, and the sectional shape in the thickness direction of all the layers of the second resin layers may be a rectangular shape. Also, the interlayer film has the shape shown in FIG. 2 in which the sectional shape in the thickness direction of at least one layer of the first resin layers may be a rectangular shape, and the sectional shape in the thickness direction of at least one layer of the second resin layers may be a rectangular shape.

FIG. 3 is a sectional view schematically showing an interlayer film for laminated glass in accordance with a third embodiment of the present invention. In FIG. 3, a section in the thickness direction of an interlayer film 10B is shown.

The interlayer film 10B shown in FIG. 3 includes first resin layers 11B, 12B and second resin layers 21B, 22B, 23B. The first resin layers 11B, 12B are layers having a glass transition temperature of less than 15° C. The second resin layers 21B, 22B, 23B are layers having a glass transition temperature of 15° C. or more. The interlayer film 10 and the interlayer film 10B are different from each other in the increment of the thickness in the region where the thickness increases.

The interlayer film 10B has one end 10*a* and the other end 10*b* being on an opposite side of the one end 10*a*. The one end 10*a* and the other end 10*b* are end parts of both sides facing each other. The sectional shape in the thickness direction of each of the first resin layers 11B, 12B, and the second resin layers 21B, 22B, 23B is a wedge-like shape. The thickness of each of the first resin layers 11B, 12B, and the second resin layers 21B, 22B, 23B is larger in the other end 10*b* side than in the one end 10*a* side. Accordingly, the thickness of the other end 10*b* of the interlayer film 10B is larger than the thickness of the one end 10*a* thereof. The interlayer film 10B has a region being thin in thickness and a region being thick in thickness.

The interlayer film 10B has a region where the thickness increases from the one end 10*a* side to the other end 10*b* side. The interlayer film 10B has a portion where the increment of the thickness decreases from the one end 10*a* side to the other end 10*b* side in the region where the thickness increases. The interlayer film 10B has a region with a wedge-like sectional shape in the thickness direction. The interlayer film 10B has a portion where the wedge angle decreases from the one end side to the other end side in the region with a wedge-like sectional shape in the thickness direction.

The interlayer film 10B has a region for display R1 corresponding to a display region of a head-up display. The interlayer film 10B has a surrounding region R2 neighboring the region for display R1. The interlayer film 10B has a shading region R3 that is separate from the region for display R1. The shading region R3 is located in an edge portion of the interlayer film 10B.

The interlayer film has the shape shown in FIG. 3 and may have a six or more-layer structure. The interlayer film has the shape shown in FIG. 3, and may lack a region for display and may lack a shading region. Also, the interlayer film has the shape shown in FIG. 3 and may have a portion where the first resin layer and the second resin layer are not alternately laminated. The interlayer film has the shape shown in FIG. 3, and the first resin layer may be a surface layer. Also, the interlayer film has the shape shown in FIG. 3 in which the sectional shape in the thickness direction of all the layers of the first resin layers may be a rectangular shape, and the sectional shape in the thickness direction of all the layers of the second resin layers may be a rectangular shape. Also, the interlayer film has the shape shown in FIG. 3 in which the sectional shape in the thickness direction of at least one layer of the first resin layers may be a rectangular shape, and the sectional shape in the thickness direction of at least one layer of the second resin layers may be a rectangular shape.

FIG. 4 is a sectional view schematically showing an interlayer film for laminated glass in accordance with a fourth embodiment of the present invention. In FIG. 4, a section in the thickness direction of an interlayer film 10C is shown.

The interlayer film 10C has one end 10*a* and the other end 10*b* being on an opposite side of the one end 10*a*. The one end 10*a* and the other end 10*b* are end parts of both sides facing each other. The sectional shape in the thickness direction of each of first resin layers 11C, 12C, and a second resin layer 22C is a wedge-like shape. The thickness of each of the first resin layers 11C, 12C, and the second resin layer 22C is larger in the other end 10*b* side than in the one end 10*a* side. The thickness of the other end 10*b* of the interlayer film 10C is larger than the thickness of the one end 10*a* thereof. The interlayer film 10C has a region being thin in thickness and a region being thick in thickness.

The interlayer film 10C has a region where the thickness increases from the one end 10*a* side to the other end 10*b* side. In the interlayer film 10C, the increment of the thickness is constant from the one end 10*a* side to the other end 10*b* side in the region where the thickness increases.

The interlayer film 10C includes the first resin layers 11C, 12C and the second resin layers 21C, 22C, 23C. The first resin layers 11C, 12C are layers having a glass transition temperature of less than 15° C. The second resin layers 21C, 22C, 23C are layers having a glass transition temperature of 15° C. or more. The second resin layer 21C and the second resin layer 23C are integrated at the one end 10*a* side and the other end 10*b* side. The first resin layers 11C, 12C and the second resin layer 22C are embedded between the second resin layer 21C and the second resin layer 23C. The interlayer film 10C has a portion having a five-layer structure, and a portion having a one-layer structure. The interlayer film 10C has a region where the first resin layer and the second resin layer are alternately laminated in the thickness direction.

The interlayer film 10C has a region for display R1 corresponding to a display region of a head-up display. The interlayer film 10C has a surrounding region R2 neighboring the region for display R1. The interlayer film 10C has a shading region R3 that is separate from the region for display R1. The shading region R3 is located in an edge portion of the interlayer film 10C.

In the region for display R1, the interlayer film 10C has a five-layer structure. In the region from the position of 100 mm to the position of 400 mm from the one end 10*a* toward the other end 10*b*, the interlayer film 10C has a five-layer structure.

In the interlayer film, the sectional shape in the thickness direction of the first resin layer may be a wedge-like shape, or may be a rectangular shape. It is preferred that the sectional shape in the thickness direction of the first resin layer be a wedge-like shape. In the interlayer film, the sectional shape in the thickness direction of the second resin layer may be a wedge-like shape, or may be a rectangular shape. It is preferred that the sectional shape in the thickness direction of the second resin layer be a wedge-like shape.

Hereinafter, materials that can be used in the interlayer film according to the present invention are specifically described.

(Thermoplastic Resin)

The interlayer film contains a resin (hereinafter, sometimes described as a resin (0)). It is preferred that the interlayer film contain a thermoplastic resin (hereinafter, sometimes described as a thermoplastic resin (0)). It is preferred that the interlayer film contain a polyvinyl acetal resin (hereinafter, sometimes described as a polyvinyl acetal resin (0)) as the thermoplastic resin (0). The first resin layer contains a resin (hereinafter, sometimes described as a resin (1)). It is preferred that the first resin layer contain a thermoplastic resin (hereinafter, sometimes described as a thermoplastic resin (1)). It is preferred that the first resin layer contain a polyvinyl acetal resin (hereinafter, sometimes described as a polyvinyl acetal resin (1)) as the thermoplastic resin (1) The second resin layer contains a resin (hereinafter, sometimes described as a resin (2)). It is preferred that the second resin layer contain a thermoplastic resin (hereinafter, sometimes described as a thermoplastic resin (2)). It is preferred that the second resin layer contain a polyvinyl acetal resin (hereinafter, sometimes described as a polyvinyl acetal resin (2)) as the thermoplastic resin (2). The resin (1) and the resin (2) may be the same as or different from each other. The thermoplastic resin (1) and the thermoplastic resin (2) may be the same as or different from each other. It is preferred that both of the thermoplastic resin (1) and the thermoplastic resin (2) be a polyvinyl acetal resin. The polyvinyl acetal resin (1) and the polyvinyl acetal resin (2) may be the same or different from each other. One kind of each of the thermoplastic resin (0), the thermoplastic resin (1) and the thermoplastic resin (2) may be used alone, and two or more kinds thereof may be used in combination. One kind of each of the polyvinyl acetal resin (0), the polyvinyl acetal resin (1) and the polyvinyl acetal resin (2) may be used alone, and two or more kinds thereof may be used in combination.

Examples of the thermoplastic resin include a polyvinyl acetal resin, an ethylene-vinyl acetate copolymer resin, an ethylene-acrylic acid copolymer resin, a polyurethane resin, an ionomer resin, a polyvinyl alcohol resin, and the like. Thermoplastic resins other than these may be used.

For example, the polyvinyl acetal resin can be produced by acetalizing polyvinyl alcohol (PVA) with an aldehyde. It is preferred that the polyvinyl acetal resin be an acetalized product of polyvinyl alcohol. For example, the polyvinyl alcohol can be obtained by saponifying polyvinyl acetate. The saponification degree of the polyvinyl alcohol generally lies within the range of 70% by mole to 99.9% by mole.

The average polymerization degree of the polyvinyl alcohol (PVA) is preferably 200 or more, more preferably 500 or more, still more preferably 1500 or more, further preferably 1600 or more, especially preferably 2600 or more, most preferably 2700 or more, and is preferably 5000 or less, more preferably 4000 or less, further preferably 3500 or less. When the average polymerization degree is the above lower limit or more, the penetration resistance of the laminated glass is further enhanced. When the average polymerization degree is the above upper limit or less, formation of an interlayer film is facilitated.

The polymerization degree of the polyvinyl acetate is determined by a method conforming to JIS K6726 “Testing methods for polyvinyl acetate”.

The number of carbon atoms of the acetal group contained in the polyvinyl acetal resin is not particularly limited. The aldehyde used at the time of producing the polyvinyl acetal resin is not particularly limited. The number of carbon atoms of the acetal group in the polyvinyl acetal resin is preferably 3 to 5, more preferably 3 or 4. When the number of carbon atoms of the acetal group in the polyvinyl acetal resin is 3 or more, the glass transition temperature of the interlayer film is sufficiently lowered. The number of carbon atoms of the acetal group in the polyvinyl acetal resin may be 4 or 5.

The aldehyde is not particularly limited. In general, an aldehyde with 1 to 10 carbon atoms is suitably used. Examples of the aldehyde with 1 to 10 carbon atoms include propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, benzaldehyde, and the like. The aldehyde is preferably propionaldehyde, n-butyraldehyde, isobutyraldehyde, n-hexylaldehyde, or n-valeraldehyde, more preferably propionaldehyde, n-butyraldehyde or isobutyraldehyde, and further preferably n-butyraldehyde. One kind of the aldehyde may be used alone, and two or more kinds thereof may be used in combination.

The content of the hydroxyl group (the amount of hydroxyl groups) of the polyvinyl acetal resin (0) is preferably 15% by mole or more, more preferably 18% by mole or more and is preferably 40% by mole or less, more preferably 35% by mole or less. When the content of the hydroxyl group is the above lower limit or more, the adhesive force of the interlayer film is further enhanced. Moreover, when the content of the hydroxyl group is the above-described upper limit or less, the flexibility of the interlayer film is enhanced and the handling of the interlayer film is facilitated.

The content of the hydroxyl group (the amount of hydroxyl groups) of the polyvinyl acetal resin (1) is preferably 17% by mole or more, more preferably 20% by mole or more, and further preferably 22% by mole or more. The content of the hydroxyl group (the amount of hydroxyl groups) of the polyvinyl acetal resin (1) is preferably 30% by mole or less, more preferably 28% by mole or less, still more preferably 27% by mole or less, further preferably 25% by mole or less, especially preferably less than 25% by mole, most preferably 24% by mole or less. When the content of the hydroxyl group is the above lower limit or more, the mechanical strength of the interlayer film is further enhanced. In particular, when the content of the hydroxyl group of the polyvinyl acetal resin (1) is 20% by mole or more, the resin is high in reaction efficiency and is excellent in productivity, when being 30% by mole or less, the sound insulating property of the laminated glass are further enhanced, and when being 28% by mole or less, the sound insulating property is further enhanced. Moreover, when the content of the hydroxyl group is the above-described upper limit or less, the flexibility of the interlayer film is enhanced and the handling of the interlayer film is facilitated.

The content of the hydroxyl group of the polyvinyl acetal resin (2) is preferably 25% by mole or more, more preferably 28% by mole or more, still more preferably 30% by mole or more, further preferably more than 31% by mole, still further preferably 31.5% by mole or more, especially preferably 32% by mole or more, and most preferably 33% by mole or more. The content of the hydroxyl group of the polyvinyl acetal resin (2) is preferably 38% by mole or less, more preferably 37% by mole or less, further preferably 36.5% by mole or less, and especially preferably 36% by mole or less. When the content of the hydroxyl group is the above lower limit or more, the adhesive force of the interlayer film is further enhanced. Moreover, when the content of the hydroxyl group is the above upper limit or less, the flexibility of the interlayer film is enhanced and the handling of the interlayer film is facilitated.

From the viewpoint of further enhancing the sound insulating property, it is preferred that the content of the hydroxyl group of the polyvinyl acetal resin (1) be lower than the content of the hydroxyl group of the polyvinyl acetal resin (2). From the viewpoint of still further enhancing the sound insulating property, the absolute value of difference between the content of the hydroxyl group of the polyvinyl acetal resin (1) and the content of the hydroxyl group of the polyvinyl acetal resin (2) is preferably 1% by mole or more, more preferably 5% by mole or more, further preferably 9% by mole or more, especially preferably 10% by mole or more, most preferably 12% by mole or more.

The content of the hydroxyl group of the polyvinyl acetal resin is a mole fraction, represented in percentage, obtained by dividing the amount of ethylene groups to which the hydroxyl group is bonded by the total amount of ethylene groups in the main chain. For example, the amount of ethylene groups to which the hydroxyl group is bonded can be determined in accordance with JIS K6728 “Testing methods for polyvinyl butyral”.

The acetylation degree (the amount of acetyl groups) of the polyvinyl acetal resin (0) is preferably 0.1% by mole or more, more preferably 0.3% by mole or more, further preferably 0.5% by mole or more and is preferably 30% by mole or less, more preferably 25% by mole or less, and further preferably 20% by mole or less. When the acetylation degree is the above lower limit or more, the compatibility between the polyvinyl acetal resin and a plasticizer is enhanced. When the acetylation degree is the above upper limit or less, with regard to the interlayer film and laminated glass, the moisture resistance thereof is enhanced.

The acetylation degree (the amount of acetyl groups) of the polyvinyl acetal resin (1) is preferably 0.01% by mole or more, more preferably 0.1% by mole or more, even more preferably 7% by mole or more, further preferably 9% by mole or more and is preferably 30% by mole or less, more preferably 25% by mole or less, further preferably 24% by mole or less, especially preferably 20% by mole or less.

When the acetylation degree is the above lower limit or more, the compatibility between the polyvinyl acetal resin and a plasticizer is enhanced. When the acetylation degree is the above upper limit or less, with regard to the interlayer film and laminated glass, the moisture resistance thereof is enhanced. In particular, when the acetylation degree of the polyvinyl acetal resin (1) is 0.1% by mole or more and is 25% by mole or less, the resulting laminated glass is excellent in penetration resistance.

The acetylation degree of the polyvinyl acetal resin (2) is preferably 0.01% by mole or more, more preferably 0.5% by mole or more, and is preferably 10% by mole or less, more preferably 2% by mole or less. When the acetylation degree is the above lower limit or more, the compatibility between the polyvinyl acetal resin and a plasticizer is enhanced. When the acetylation degree is the above upper limit or less, with regard to the interlayer film and laminated glass, the moisture resistance thereof is enhanced.

The acetylation degree is a mole fraction, represented in percentage, obtained by dividing the amount of ethylene groups to which the acetyl group is bonded by the total amount of ethylene groups in the main chain. For example, the amount of ethylene groups to which the acetyl group is bonded can be determined in accordance with JIS K6728 "Testing methods for polyvinyl butyral".

The acetalization degree of the polyvinyl acetal resin (0) (the butyralization degree in the case of a polyvinyl butyral resin) is preferably 60% by mole or more and more preferably 63% by mole or more and is preferably 85% by mole or less, more preferably 75% by mole or less, further preferably 70% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree of the polyvinyl acetal resin (1) (the butyralization degree in the case of a polyvinyl butyral resin) is preferably 47% by mole or more and more preferably 60% by mole or more, and is preferably 85 by mole or less, more preferably 80% by mole or less, further preferably 75% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree of the polyvinyl acetal resin (2) (the butyralization degree in the case of a polyvinyl butyral resin) is preferably 55% by mole or more, more preferably 60% by mole or more and is preferably 75% by mole or less, and more preferably 71% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree is determined in the following manner. From the total amount of the ethylene group in the main chain, the amount of the ethylene group to which the hydroxyl group is bonded and the amount of the ethylene group to which the acetyl group is bonded are subtracted. The obtained value is divided by the total amount of the ethylene group in the main chain to obtain a mole fraction. The mole fraction represented in percentage is the acetalization degree.

In this connection, it is preferred that the content of the hydroxyl group (the amount of hydroxyl groups), the acetalization degree (the butyralization degree) and the acetylation degree be calculated from the results determined by a method conforming to JIS K6728 "Testing methods for polyvinyl butyral". In this context, a method in accordance with ASTM D1396-92 may be used. When the polyvinyl acetal resin is a polyvinyl butyral resin, the content of the hydroxyl group (the amount of hydroxyl groups), the acetalization degree (the butyralization degree) and the acetylation degree can be calculated from the results measured by a method conforming to JIS K6728 "Testing methods for polyvinyl butyral".

In 100% by weight of the thermoplastic resin contained in the interlayer film, the content of the polyvinyl acetal resin is preferably 10% by weight or more, more preferably 30% by weight or more, still more preferably 50% by weight or more, further preferably 70% by weight or more, especially preferably 80% by weight or more, most preferably 90% by weight or more. In 100% by weight of the thermoplastic resin contained in the interlayer film, the content of the polyvinyl acetal resin may be 100% by weight or less. It is preferred that the main ingredient (50% by weight or more) of the thermoplastic resin of the interlayer film be a polyvinyl acetal resin.

In 100% by weight of the thermoplastic resin contained in the first resin layer, the content of the polyvinyl acetal resin is preferably 10% by weight or more, more preferably 30% by weight or more, still more preferably 50% by weight or more, further preferably 70% by weight or more, especially preferably 80% by weight or more, most preferably 90% by weight or more. In 100% by weight of the thermoplastic resin contained in the first resin layer, the content of the polyvinyl acetal resin may be 100% by weight or less. It is preferred that the main ingredient (50% by weight or more) of the thermoplastic resin of the first resin layer be a polyvinyl acetal resin.

In 100% by weight of the thermoplastic resin contained in the second resin layer, the content of the polyvinyl acetal resin is preferably 10% by weight or more, more preferably 30% by weight or more, still more preferably 50, by weight or more, further preferably 70% by weight or more, especially preferably 80% by weight or more, most preferably 90% by weight or more. In 100% by weight of the thermoplastic resin contained in the second resin layer, the content of the polyvinyl acetal resin may be 100% by weight or less. It is preferred that the main ingredient (50% by weight or more) of the thermoplastic resin of the second resin layer be a polyvinyl acetal resin.

(Plasticizer)

From the viewpoint of further enhancing the adhesive force of an interlayer film, it is preferred that the interlayer film according to the present invention contain a plasticizer (hereinafter, sometimes described as a plasticizer (0)). It is preferred that the first resin layer contain a plasticizer (hereinafter, sometimes described as a plasticizer (1)). It is preferred that the second resin layer contain a plasticizer (hereinafter, sometimes described as a plasticizer (2)). When the thermoplastic resin contained in the interlayer film is a polyvinyl acetal resin, it is especially preferred that the interlayer film (the respective layers) contain a plasticizer. It is preferred that a layer containing a polyvinyl acetal resin contain a plasticizer.

The plasticizer is not particularly limited. As the plasticizer, a conventionally known plasticizer can be used. One kind of the plasticizer may be used alone and two or more kinds thereof may be used in combination.

Examples of the plasticizer include organic ester plasticizers such as a monobasic organic acid ester and a polybasic organic acid ester, organic phosphate plasticizers and organic phosphite plasticizers, and the like. It is preferred that the plasticizer be an organic ester plasticizer. It is preferred that the plasticizer be a liquid plasticizer.

Examples of the monobasic organic acid ester include a glycol ester obtained by the reaction of a glycol with a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, heptanoic acid, n-octylic acid, 2-ethylhexanoic acid, n-nonylic acid, decylic acid, benzoic acid and the like.

Examples of the polybasic organic acid ester include an ester compound of a polybasic organic acid and an alcohol having a linear or branched structure of 4 to 8 carbon atoms, and the like. Examples of the polybasic organic acid include adipic acid, sebacic acid, azelaic acid, and the like.

Examples of the organic ester plasticizer include triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, diethylene glycol dibenzoate, dipropylene glycol dibenzoate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic alkyds, a mixture of a phosphoric acid ester and an adipic acid ester, and the like. As the organic ester plasticizer, other organic ester plasticizer than those recited above may be used. As the adipic acid ester, adipic acid esters other than the aforementioned adipic acid esters may be used.

Examples of the organic phosphate plasticizer include tributoxyethyl phosphate, isodecyl phenyl phosphate, triisopropyl phosphate, and the like.

It is preferred that the plasticizer be a diester plasticizer represented by the following formula (1).

[Chemical 1]

(1)

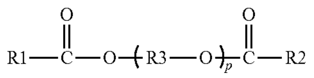

In the formula (1), R1 and R2 each represent an organic group with 2 to 10 carbon atoms, R3 represents an ethylene group, an isopropylene group, or an n-propylene group, and p represents an integer of 3 to 10. R1 and R2 in the formula (1) each are preferably an organic group with 5 to 10 carbon atoms, and more preferably an organic group with 6 to 10 carbon atoms.

It is preferred that the plasticizer include triethylene glycol di-2-ethylhexanoate (3GO), triethylene glycol di-2-ethylbutyrate (3GH) or triethylene glycol di-2-ethylpropanoate. It is more preferred that the plasticizer include triethylene glycol di-2-ethylhexanoate (3GO) or triethylene glycol di-2-ethylbutyrate (3GH), and it is further preferred that the plasticizer include triethylene glycol di-2-ethylhexanoate (3GO).

In the interlayer film, the content of the plasticizer (0) relative to 100 parts by weight of the thermoplastic resin (0) is defined as content (0). The content (0) is preferably 5 parts by weight or more, more preferably 25 parts by weight or more, further preferably 30 parts by weight or more, and is preferably 100 parts by weight or less, more preferably 60 parts by weight or less, further preferably 50 parts by weight or less. When the content (0) is the above lower limit or more, the penetration resistance of the laminated glass is further enhanced. When the content (0) is the above upper limit or less, the transparency of the interlayer film is further enhanced.

In the first resin layer, the content of the plasticizer (1) relative to 100 parts by weight of the thermoplastic resin (1) is defined as content (1). The content (1) is preferably 50 parts by weight or more, more preferably 55 parts by weight or more, further preferably 60 parts by weight or more. The content (1) is preferably 100 parts by weight or less, more preferably 90 parts by weight or less, further preferably 85 parts by weight or less, especially preferably 80 parts by weight or less. When the content (1) is the above lower limit or more, the flexibility of the interlayer film is enhanced and the handling of the interlayer film is facilitated. When the content (1) is the above upper limit or less, the penetration resistance of the laminated glass is further enhanced.

In the second resin layer, the content of the plasticizer (2) relative to 100 parts by weight of the thermoplastic resin (2) is defined as content (2). The content (2) is preferably 5 parts by weight or more, more preferably 10 parts by weight or more, still more preferably 15 parts by weight or more, further preferably 20 parts by weight or more, especially preferably 24 parts by weight or more, most preferably 25 parts by weight or more. The content (2) is preferably 45 parts by weight or less, more preferably 40 parts by weight or less, further preferably 35 parts by weight or less, especially preferably 32 parts by weight or less, most preferably 30 parts by weight or less. When the content (2) is the above lower limit or more, the flexibility of the interlayer film is enhanced and the handling of the interlayer film is facilitated. When the content (2) is the above upper limit or less, the penetration resistance of laminated glass is further enhanced.

In order to enhance the sound insulating property of laminated glass, it is preferred that the content (1) be larger than the content (2).

From the viewpoint of further enhancing the sound insulating property of laminated glass, an absolute value of difference between the content (2) and the content (1) is preferably 10 parts by weight or more, more preferably 15 parts by weight or more, further preferably 20 parts by weight or more, and is preferably 80 parts by weight or less, more preferably 75 parts by weight or less, further preferably 70 parts by weight or less.

(Heat Shielding Substance)

It is preferred that the interlayer film contain a heat shielding substance. It is preferred that the first resin layer contain a heat shielding substance. It is preferred that the second resin layer contain a heat shielding substance. One kind of the heat shielding substance may be used alone, and two or more kinds thereof may be used in combination.

It is preferred that the heat shielding substance contain at least one kind of Ingredient X among a phthalocyanine compound, a naphthalocyanine compound, and an anthracyanine compound or contain heat shielding particles. In this case, the heat shielding substance may contain both of the Ingredient X and the heat shielding particles.

Ingredient X:

It is preferred that the interlayer film contain at least one kind of Ingredient X among a phthalocyanine compound, a naphthalocyanine compound, and an anthracyanine compound. It is preferred that the first resin layer contain the Ingredient X. It is preferred that the second resin layer contain the Ingredient X. The Ingredient X is a heat shielding substance. One kind of the Ingredient X may be used alone and two or more kinds thereof may be used in combination.

The Ingredient X is not particularly limited. Examples of the Ingredient X that can be used include a phthalocyanine compound, a naphthalocyanine compound and an anthracyanine compound that are conventionally known.

Examples of the Ingredient X include phthalocyanine, a derivative of phthalocyanine, naphthalocyanine, a derivative of naphthalocyanine, anthracyanine, and a derivative of anthracyanine, and the like. It is preferred that each of the phthalocyanine compound and the derivative of phthalocyanine have a phthalocyanine skeleton. It is preferred that each of the naphthalocyanine compound and the derivative of naphthalocyanine have a naphthalocyanine skeleton. It is preferred that each of the anthracyanine compound and the derivative of anthracyanine have an anthracyanine skeleton.

From the viewpoint of further enhancing the heat shielding property of the interlayer film and the laminated glass, it is preferred that the Ingredient X be at least one kind selected from the group consisting of phthalocyanine, a derivative of phthalocyanine, naphthalocyanine and a derivative of naphthalocyanine, and it is more preferred that the Ingredient X be at least one kind among phthalocyanine and a derivative of phthalocyanine.

From the viewpoints of effectively enhancing the heat shielding property and maintaining the visible light transmittance at a higher level over a long period of time, it is preferred that the Ingredient X contain vanadium atoms or copper atoms. It is preferred that the Ingredient X contain vanadium atoms and it is also preferred that the Ingredient X contain copper atoms. It is more preferred that the Ingredient X be at least one kind among phthalocyanine containing vanadium atoms or copper atoms and a derivative of phthalocyanine containing vanadium atoms or copper atoms. From the viewpoint of still further enhancing the heat shielding property of the interlayer film and the laminated glass, it is preferred that the Ingredient X have a structural unit in which an oxygen atom is bonded to a vanadium atom.

In 100% by weight of the interlayer film or in 100% by weight of a layer containing the Ingredient X (a first resin layer or a second resin layer), the content of the Ingredient X is preferably 0.001% by weight or more, more preferably 0.005% by weight or more, further preferably 0.01% by weight or more, especially preferably 0.02% by weight or more. In 100% by weight of the interlayer film or in 100% by weight of a layer containing the Ingredient X (a first resin layer or a second resin layer), the content of the Ingredient X is preferably 0.2% by weight or less, more preferably 0.1% by weight or less, further preferably 0.05% by weight or less, especially preferably 0.04% by weight or less. When the content of the Ingredient X is the above lower limit or more and the above upper limit or less, the heat shielding property is sufficiently enhanced and the visible light transmittance is sufficiently enhanced. For example, it is possible to make the visible light transmittance 70% or more.

Heat Shielding Particles:

It is preferred that the interlayer film contain heat shielding particles. It is preferred that the first resin layer contain the heat shielding particles. It is preferred that the second resin layer contain the heat shielding particles. The heat shielding particle is of a heat shielding substance. By the use of heat shielding particles, infrared rays (heat rays) can be effectively cut off. One kind of the heat shielding particles may be used alone, and two or more kinds thereof may be used in combination.

From the viewpoint of further enhancing the heat shielding property of the laminated glass, it is more preferred that the heat shielding particles be metal oxide particles. It is preferred that the heat shielding particle be a particle (a metal oxide particle) formed from an oxide of a metal.

The energy amount of an infrared ray with a wavelength (780 nm or more) that is longer than that of visible light is small as compared with an ultraviolet ray. However, the thermal action of infrared rays is large, and when infrared rays are absorbed into a substance, heat is released from the substance. Accordingly, infrared rays are generally called heat rays. By the use of the heat shielding particles, infrared rays (heat rays) can be effectively cut off. In this connection, the heat shielding particle means a particle capable of absorbing infrared rays.

Examples of the heat shielding particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, tungsten oxide particles, tin-doped indium oxide particles (ITO particles), tin-doped zinc oxide particles and silicon-doped zinc oxide particles, and lanthanum hexaboride ($LaB_6$) particles, and the like. Heat shielding particles other than these may be used as the heat shielding particles. Since the heat ray shielding function is high, the heat shielding particles are preferably metal oxide particles, and more preferably ATO particles, GZO particles, IZO particles, ITO particles or tungsten oxide particles. In particular, since the heat ray shielding function is high and the particles are readily available, it is preferred that the heat shielding particles be ITO particles or tungsten oxide particles.

From the viewpoint of further enhancing the heat shielding property of the interlayer film and the laminated glass, it is preferred that the tungsten oxide particles be metal-doped tungsten oxide particles. Examples of the "tungsten oxide particles" include metal-doped tungsten oxide particles. Examples of the metal-doped tungsten oxide particles include sodium-doped tungsten oxide particles, cesium-doped tungsten oxide particles, thallium-doped tungsten oxide particles, rubidium-doped tungsten oxide particles, and the like.

From the viewpoint of further enhancing the heat shielding property of the interlayer film and the laminated glass, cesium-doped tungsten oxide particles are especially preferred. From the viewpoint of still further enhancing the heat shielding property of the interlayer film and the laminated glass, it is preferred that the cesium-doped tungsten oxide particles be tungsten oxide particles represented by the formula: $Cs_{0.35}WO_3$.

The average particle diameter of the heat shielding particles is preferably 0.01 μm or more, more preferably 0.02 μm or more, and is preferably 0.1 μm or less, more preferably 0.05 μm or less. When the average particle diameter is the above lower limit or more, the heat ray shielding property is sufficiently enhanced. When the average particle diameter is the above upper limit or less, the dispersibility of heat shielding particles is enhanced.

The "average particle diameter" refers to the volume average particle diameter. The average particle diameter can be measured using a particle size distribution measuring apparatus ("UPA-EX150" available from NIKKISO CO., LTD.), or the like.

In 100% by weight of the interlayer film or in 100% by weight of a layer containing the heat shielding particles (a first resin layer or a second resin layer), each content of the heat shielding particles (in particular, the content of tungsten oxide particles) is preferably 0.01% by weight or more, more preferably 0.1% by weight or more, further preferably 1% by weight or more, especially preferably 1.5% by weight or more. In 100% by weight of the interlayer film or in 100% by weight of a layer containing the heat shielding particles (a first resin layer or a second resin layer), each content of the heat shielding particles (in particular, the content of tungsten oxide particles) is preferably 6: by weight or less, more preferably 5.5% by weight or less, further preferably 4% by weight or less, especially preferably 3.5% by weight or less, most preferably 3% by weight or less. When the content of the heat shielding particles is the above lower limit or more and the above upper limit or less, the heat shielding property is sufficiently enhanced and the visible light transmittance is sufficiently enhanced.

(Metal Salt)

It is preferred that the interlayer film contain at least one kind of metal salt (hereinafter, sometimes described as Metal salt M) of alkali metal salts and alkali earth metal salts. It is preferred that the first resin layer contain the Metal salt M. It is preferred that the second resin layer contain the Metal salt M. The alkali earth metal means six metals of Be, Mg, Ca, Sr, Ba, and Ra. By the use of the Metal salt M, controlling the adhesivity between the interlayer film and a lamination glass member such as a glass plate or the adhesivity between respective layers in the interlayer film is facilitated. One kind of the Metal salt M may be used alone, and two or more kinds thereof may be used in combination.

It is preferred that the Metal salt M contain at least one kind of metal selected from the group consisting of Li, Na, K, Rb, Cs, Mg, Ca, Sr and Ba. It is preferred that the metal salt contained in the interlayer film contain at least one kind of metal between K and Mg.

As the metal salt M, an alkali metal salt of an organic acid having 2 to 16 carbon atoms, and an alkali earth metal salt of an organic acid having 2 to 16 carbon atoms can be used. The metal salt M may include a magnesium carboxylate having 2 to 16 carbon atoms, or a potassium carboxylate having 2 to 16 carbon atoms.

Examples of the magnesium carboxylate with 2 to 16 carbon atoms and the potassium carboxylate with 2 to 16 carbon atoms include magnesium acetate, potassium acetate, magnesium propionate, potassium propionate, magnesium 2-ethylbutyrate, potassium 2-ethylbutanoate, magnesium 2-ethylhexanoate, potassium 2-ethylhexanoate, and the like.

The total of the contents of Mg and K in the interlayer film containing the Metal salt M or a layer containing the Metal salt M (a first resin layer or a second resin layer) is preferably 5 ppm or more, more preferably 10 ppm or more, further preferably 20 ppm or more, and is preferably 300 ppm or less, more preferably 250 ppm or less, further preferably 200 ppm or less. When the total of the contents of Mg and K is the above lower limit or more and the above upper limit or less, the adhesivity between the interlayer film and a glass plate or the adhesivity between respective layers in the interlayer film can be further well controlled.

(Ultraviolet Ray Screening Agent)

It is preferred that the interlayer film contain an ultraviolet ray screening agent. It is preferred that the first resin layer contain an ultraviolet ray screening agent. It is preferred that the second resin layer contain an ultraviolet ray screening agent. By the use of an ultraviolet ray screening agent, even when the interlayer film and the laminated glass are used for a long period of time, the visible light transmittance becomes further hard to be lowered. One kind of the ultraviolet ray screening agent may be used alone, and two or more kinds thereof may be used in combination.

Examples of the ultraviolet ray screening agent include an ultraviolet absorber. It is preferred that the ultraviolet ray screening agent be an ultraviolet absorber.

Examples of the ultraviolet ray screening agent include an ultraviolet ray screening agent containing a metal atom, an ultraviolet ray screening agent containing a metal oxide, an ultraviolet ray screening agent having a benzotriazole structure (a benzotriazole compound), an ultraviolet ray screening agent having a benzophenone structure (a benzophenone compound), an ultraviolet ray screening agent having a triazine structure (a triazine compound), an ultraviolet ray screening agent having a malonic acid ester structure (a malonic acid ester compound), an ultraviolet ray screening agent having an oxanilide structure (an oxanilide compound), and an ultraviolet ray screening agent having a benzoate structure (a benzoate compound), and the like.

Examples of the ultraviolet ray screening agent containing a metal atom include platinum particles, particles in which the surface of platinum particles is coated with silica, palladium particles, and particles in which the surface of palladium particles is coated with silica, and the like. It is preferred that the ultraviolet ray screening agent not be heat shielding particles.

The ultraviolet ray screening agent is preferably an ultraviolet ray screening agent having a benzotriazole structure, an ultraviolet ray screening agent having a benzophenone structure, an ultraviolet ray screening agent having a triazine structure, or an ultraviolet ray screening agent having a benzoate structure. The ultraviolet ray screening agent is more preferably an ultraviolet ray screening agent having a benzotriazole structure or an ultraviolet ray screening agent having a benzophenone structure, and is further preferably an ultraviolet ray screening agent having a benzotriazole structure.

Examples of the ultraviolet ray screening agent containing a metal oxide include zinc oxide, titanium oxide, cerium oxide, and the like. Furthermore, with regard to the ultraviolet ray screening agent containing a metal oxide, the surface may be coated. Examples of the coating material for the surface of the ultraviolet ray screening agent containing a metal oxide include an insulating metal oxide, a hydrolyzable organosilicon compound, a silicone compound, and the like.

Examples of the insulating metal oxide include silica, alumina, zirconia, and the like. For example, the insulating metal oxide has a band-gap energy of 5.0 eV or more.

Examples of the ultraviolet ray screening agent having a benzotriazole structure include 2-(2'-hydroxy-5'-methylphenyl)benzotriazole ("Tinuvin P" available from BASF Japan Ltd.), 2-(2'-hydroxy-3',5'-di-t-butylphenyl)benzotriazole ("Tinuvin 320" available from BASF Japan Ltd.), 2-(2'-hydroxy-3'-t-butyl-5-methylphenyl)-5-chlorobenzotriazole ("Tinuvin 326" available from BASF Japan Ltd.), 2-(2'-hydroxy-3',5'-di-amylphenyl)benzotriazole ("Tinuvin 328" available from BASF Japan Ltd.), and the like. It is preferred that the ultraviolet ray screening agent be an ultraviolet ray screening agent having a benzotriazole structure containing a halogen atom, and it is more preferred that the ultraviolet ray screening agent be an ultraviolet ray screening agent having a benzotriazole structure containing a chlorine atom, because those are excellent in ultraviolet ray screening performance.

Examples of the ultraviolet ray screening agent having a benzophenone structure include octabenzone ("Chimassorb 81" available from BASF Japan Ltd.), and the like.

Examples of the ultraviolet ray screening agent having a triazine structure include "LA-F70" available from ADEKA CORPORATION, 2-(4,6-diphenyl-1,3,5-triazin-2-yl)-5-[(hexyl)oxy]-phenol ("Tinuvin 1577FF" available from BASF Japan Ltd.), and the like.

Examples of the ultraviolet ray screening agent having a malonic acid ester structure include dimethyl 2-(p-methoxybenzylidene)malonate, tetraethyl-2,2-(1,4-phenylenedimethylidene)bismalonate, 2-(p-methoxybenzylidene)-bis (1,2,2,6,6-pentamethyl-4-piperidinyl)malonate, and the like.

Examples of a commercial product of the ultraviolet ray screening agent having a malonic acid ester structure include Hostavin B-CAP, Hostavin PR-25 and Hostavin PR-31 (any of these is available from Clariant Japan K.K.).

Examples of the ultraviolet ray screening agent having an oxanilide structure include a kind of oxalic acid diamide having a substituted aryl group and the like on the nitrogen atom such as N-(2-ethylphenyl)-N'-(2-ethoxy-5-t-butylphenyl)oxalic acid diamide, N-(2-ethylphenyl)-N'-(2-ethoxy-phenyl)oxalic acid diamide and 2-ethyl-2'-ethoxy-oxalanilide ("Sanduvor VSU" available from Clariant Japan K.K.).

Examples of the ultraviolet ray screening agent having a benzoate structure include 2,4-di-tert-butylphenyl-3,5-di-tert-butyl-4-hydroxybenzoate ("Tinuvin 120" available from BASF Japan Ltd.), and the like.

In 100% by weight of the interlayer film or in 1007, by weight of a layer containing the ultraviolet ray screening agent (a first resin layer or a second resin layer), the content of the ultraviolet ray screening agent and the content of the benzotriazole compound are preferably 0.1% by weight or more, more preferably 0.22 by weight or more, further preferably 0.3% by weight or more, especially preferably 0.5% by weight or more. In this case, decrease in visible light transmittance after a lapse of the term is further suppressed. In 100% by weight of the interlayer film or in 100% by weight of a layer containing the ultraviolet ray screening agent (a first resin layer or a second resin layer), the content of the ultraviolet ray screening agent and the content of the benzotriazole compound are preferably 2.5% by weight or less, more preferably 2% by weight or less, further preferably 1 by weight or less, especially preferably 0.8% by weight or less. In particular, by setting the content of the ultraviolet ray screening agent to be 0.2% by weight or more in 100% by weight of a layer containing the ultraviolet ray screening agent, with regard to the interlayer film and laminated glass, the lowering in visible light transmittance thereof after the lapse of a certain period of time can be significantly suppressed.

(Oxidation Inhibitor)

It is preferred that the interlayer film contain an oxidation inhibitor. It is preferred that the first resin layer contain an oxidation inhibitor. It is preferred that the second resin layer contain an oxidation inhibitor. One kind of the oxidation inhibitor may be used alone, and two or more kinds thereof may be used in combination.

Examples of the oxidation inhibitor include a phenol-based oxidation inhibitor, a sulfur-based oxidation inhibitor, a phosphorus-based oxidation inhibitor, and the like. The phenol-based oxidation inhibitor is an oxidation inhibitor having a phenol skeleton. The sulfur-based oxidation inhibitor is an oxidation inhibitor containing a sulfur atom. The phosphorus-based oxidation inhibitor is an oxidation inhibitor containing a phosphorus atom.

It is preferred that the oxidation inhibitor be a phenol-based oxidation inhibitor or a phosphorus-based oxidation inhibitor.

Examples of the phenol-based oxidation inhibitor include 2,6-di-t-butyl-p-cresol (BHT), butyl hydroxyanisole (BHA), 2,6-di-t-butyl-4-ethylphenol, stearyl β-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate]methane, 1,3,3-tris-(2-methyl-4-hydroxy-5-t-butylphenol)butane, 1,3,5-trimethyl-2,4,6-tris(3,5-di-t-butyl-4-hydroxybenzyl)benzene, bis(3,3'-t-butylphenol)butyric acid glycol ester, and bis(3-t-butyl-4-hydroxy-5-methylbenzenepropanoic acid) ethylenebis(oxyethylene), and the like. One kind or two or more kinds among these oxidation inhibitors are suitably used.

Examples of the phosphorus-based oxidation inhibitor include tridecyl phosphite, tris(tridecyl) phosphite, triphenyl phosphite, trinonylphenyl phosphite, bis(tridecyl)pentaerithritol diphosphite, bis(decyl)pentaerithritol diphosphite, tris(2,4-di-t-butylphenyl) phosphite, bis(2,4-di-t-butyl-6-methylphenyl)ethyl ester phosphorous acid, and 2,2'-methylenebis(4,6-di-t-butyl-1-phenyloxy) (2-ethylhexyloxy) phosphorus, and the like. One kind or two or more kinds among these oxidation inhibitors are suitably used.

Examples of a commercial product of the oxidation inhibitor include "IRGANOX 245" available from BASF Japan Ltd., "IRGAFOS 168" available from BASF Japan Ltd., "IRGAFOS 38" available from BASF Japan Ltd., "Sumilizer BHT" available from Sumitomo Chemical Co., Ltd., "H-BHT" available from Sakai Chemical Industry Co., Ltd., and "IRGANOX 1010" available from BASF Japan Ltd., and the like.

With regard to the interlayer film and laminated glass, in order to maintain high visible light transmittance thereof over a long period of time, the content of the oxidation inhibitor is preferably 0.03% by weight or more, more preferably 0.1% by weight or more in 100% by weight of the interlayer film or in 100% by weight of the layer containing the oxidation inhibitor (a first resin layer or a second resin layer). Moreover, since an effect commensurate with the addition of an oxidation inhibitor is not attained, it is preferred that the content of the oxidation inhibitor be 2 by weight or less in 100% by weight of the interlayer film or in 100% by weight of the layer containing the oxidation inhibitor.

(Other Ingredients)

Each of the interlayer film, the first resin layer and the second resin layer may contain additives such as a coupling agent, a dispersing agent, a surfactant, a flame retardant, an antistatic agent, an adhesive force regulator other than metal salt, a moisture-resistance agent, a fluorescent brightening agent, and an infrared ray absorber, as necessary. One kind of these additives may be used alone, and two or more kinds thereof may be used in combination.

(Other Details of Interlayer Film for Laminated Glass)

The interlayer film may be wound to be formed into a roll body of the interlayer film. The roll body may include a winding core and an interlayer film wound on the outer periphery of the winding core.

It is preferred that the interlayer film have protrusions and recesses on at least one surface of the surfaces of both sides. It is more preferred that the interlayer film have protrusions and recesses on surfaces of both sides. Examples of the method for forming the protrusions and recesses include, but are not particularly limited to, a lip emboss method (melt fracture method), an emboss roll method, a calender roll method, and a profile extrusion method, and the like.

It is preferred that the interlayer film have protrusions and recesses formed by a melt fracture method or an emboss roll method on the surface, and it is more preferred that the interlayer film have protrusions and recesses formed by a melt fracture method or an emboss roll method with a linear pressure of 0.10 kN/cm or less on the surface. By using the above method, it is possible to favorably impart protrusions and recesses even when the thickness of the surface layer is relatively small, and hence it is possible to effectively suppress the optical strain.

From the viewpoint of forming a number of protrusions and recesses that are a quantitatively consistent pattern of protrusions and recesses, it is preferred that the interlayer film have protrusions and recesses formed by an emboss roll method on the surface.

(Laminated Glass)

The laminated glass according to the present invention includes a first lamination glass member, a second lamination glass member and the aforementioned interlayer film for laminated glass. In the laminated glass according to the present invention, the above-mentioned interlayer film for laminated glass is arranged between the first lamination glass member and the second lamination glass member.

The laminated glass is, for example, a head-up display. When the laminated glass is a head-up display, the laminated glass has a display region of the head-up display. The display region is a region capable of favorably displaying information.

It is preferred that the laminated glass serve as a head-up display (HUD).

A head-up display system can be obtained by using the aforementioned head-up display. The head-up display system includes the laminated glass, and a light source device for irradiating the laminated glass with light for image display. The light source device can be attached, for example, to a dashboard in a vehicle. By irradiating the display region of the laminated glass with light from the light source device, it is possible to achieve image display.

FIG. 6 is a sectional view schematically showing an example of laminated glass prepared with the interlayer film for laminated glass shown in FIG. 1.

A laminated glass 20 shown in FIG. 6 includes a first lamination glass member 31, a second lamination glass member 32, and the interlayer film 10. The interlayer film 10 is arranged between the first lamination glass member 31 and the second lamination glass member 32 to be sandwiched therebetween. The first lamination glass member 31 is layered on a first surface (one surface) of the interlayer film 10. The second lamination glass member 32 is layered on a second surface (other surface) opposite to the first surface of the interlayer film 10. The first lamination glass member 31 is layered on the outer surface of the second resin layer 21 in the interlayer film 10. The second lamination glass member 32 is layered on the outer surface of the second resin layer 23 in the interlayer film 10.

As described above, the laminated glass according to the present invention includes a first lamination glass member, a second lamination glass member, and an interlayer film, and the interlayer film is the interlayer film for laminated glass according to the present invention.

It is preferred that the first lamination glass member be the first glass plate. It is preferred that the second lamination glass member be the second glass plate.

Examples of the first and second lamination glass members include a glass plate, and a PET (polyethylene terephthalate) film, and the like. As the laminated glass, laminated glass in which an interlayer film is sandwiched between a glass plate and a PET film or the like, as well as laminated glass in which an interlayer film is sandwiched between two glass plates, is included. The laminated glass is a laminate including a glass plate, and it is preferred that at least one glass plate be used. It is preferred that each of the first lamination glass member and the second lamination glass member be a glass plate or a PET film, and the laminated glass include a glass plate as at least one of the first lamination glass member and the second lamination glass member. It is especially preferred that both of the first and second lamination glass members be glass plates.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, wired plate glass, green glass, and the like. The organic glass is synthetic resin glass substituted for inorganic glass. Examples of the organic glass include a polycarbonate plate, a poly(meth)acrylic resin plate, and the like. Examples of the poly(meth)acrylic resin plate include a polymethyl (meth)acrylate plate, and the like.

The thicknesses of each of the first lamination glass member and the second lamination glass member is preferably 1 mm or more, and is preferably 5 mm or less, and more preferably 3 mm or less. Moreover, when the lamination glass member is a glass plate, the thickness of the glass plate is preferably 0.5 mm or more, more preferably 0.7 mm or more, preferably 5 mm or less and more preferably 3 mm or less. When the lamination glass member is a PET film, the thickness of the PET film is preferably 0.03 mm or more and is preferably 0.5 mm or less.

The method for producing the laminated glass is not particularly limited. First, the interlayer film is sandwiched between the first lamination glass member and the second lamination glass member to obtain a laminate. Then, for example, by passing the obtained laminate through pressure rolls or subjecting the obtained laminate to decompression suction in a rubber bag, the air remaining between the first and the second lamination glass members and the interlayer film is removed. Then, the laminate is preliminarily bonded together at about 70° C. to 110° C. to obtain a preliminarily press-bonded laminate. Next, by putting the preliminarily press-bonded laminate into an autoclave or by pressing the laminate, the laminate is press-bonded at about 120° C. to 150° C. and under a pressure of 1 MPa to 1.5 MPa. In this way, laminated glass can be obtained.

Each of the interlayer film and the laminated glass can be used for automobiles, railway vehicles, aircraft, ships, and buildings and the like. Each of the interlayer film and the laminated glass can also be used for applications other than these applications. It is preferred that the interlayer film and the laminated glass be an interlayer film and laminated glass for vehicles or for buildings respectively, and it is more preferred that the interlayer film and the laminated glass be an interlayer film and laminated glass for vehicles respectively. Each of the interlayer film and the laminated glass can be used for a windshield, side glass, rear glass, roof glass or glass for backlight of an automobile, and the like. The interlayer film and the laminated glass are suitably used for automobiles. The interlayer film is suitably used for obtaining laminated glass of an automobile.

Hereinafter, the present invention will be described in more detail with reference to examples and comparative examples. The present invention is not limited only to these examples.

In polyvinyl acetal resins used, n-butyraldehyde that has 4 carbon atoms is used for the acetalization. With regard to the polyvinyl acetal resin, the acetalization degree (the butyralization degree), the acetylation degree and the content of the hydroxyl group were measured by a method conforming to JIS K6728 "Testing methods for polyvinyl butyral". In this connection, even in the cases of being measured according to ASTM D1396-92, numerical values similar to those obtained by a method conforming to JIS K6728 "Testing methods for polyvinyl butyral" were exhibited.

The following ingredients were mixed, and kneaded sufficiently with a mixing roll to prepare compositions A1 to C1 for forming a first resin layer.

Composition A1 for Forming First Resin Layer:

Polyvinyl acetal resin (average polymerization degree: 3000, content of hydroxyl group: 23.8% by mole, acetylation degree: 12.4% by mole, acetalization degree: 63.8% by mole): 100 parts by weight Triethylene glycol di-2-ethylhexanoate (3GO): 60 parts by weight Tinuvin 326 (2-(2'-hydroxy-3'-t-butyl-5-methylphenyl)-5-chlorobenzotriazole, "Tinuvin 326" available from BASF Japan Ltd.): an amount that is to be 0.2% by weight in 1007 by weight of the obtained first resin layer BHT (2,6-di-t-butyl-p-cresol): an amount that is to be 0.2% by weight in 100% by weight of the obtained first resin layer Composition B1 for Forming First Resin Layer:

Polyvinyl acetal resin (average polymerization degree: 2300, content of hydroxyl group: 22.9% by mole, acetylation degree: 12.1% by mole, acetalization degree: 65% by mole): 100 parts by weight Triethylene glycol di-2-ethylhexanoate (3GO): 60 parts by weight Tinuvin 326 (2-(2'-hydroxy-3'-t-butyl-5-methylphenyl)-5-chlorobenzotriazole, "Tinuvin 326" available from BASF Japan Ltd.): an amount that is to be 0.2% by weight in 100% by weight of the obtained first resin layer BHT (2,6-di-t-butyl-p-cresol): an amount that is to be 0.2% by weight in 100% by weight of the obtained first resin layer Composition C1 for Forming First Resin Layer:

Polyvinyl acetal resin (average polymerization degree: 3000, content of hydroxyl group: 26.5% by mole, acetylation degree: 1% by mole, acetalization degree: 72.5% by mole): 100 parts by weight Triethylene glycol di-2-ethylhexanoate (3GO): 40 parts by weight Tinuvin 326 (2-(2'-hydroxy-3'-t-butyl-5-methylphenyl)-5-chlorobenzotriazole, "Tinuvin 326" available from BASF Japan Ltd.): an amount that is to be 0.2% by weight in 100% by weight of the obtained first resin layer BHT (2,6-di-t-butyl-p-cresol): an amount that is to be 0.2% by weight in 100% by weight of the obtained first resin layer The following ingredients were mixed, and kneaded sufficiently with a mixing roll to prepare compositions A2 to C2 for forming a second resin layer.

Composition A2 for Forming Second Resin Layer:

Polyvinyl acetal resin (average polymerization degree: 1700, content of hydroxyl group: 30.3% by mole, acetylation degree: 0.9% by mole, acetalization degree: 68.8% by mole): 100 parts by weight Triethylene glycol di-2-ethylhexanoate (3GO): 40 parts by weight Tinuvin 326 (2-(2'-hydroxy-3'-t-butyl-5-methylphenyl)-5-chlorobenzotriazole, "Tinuvin 326" available from BASF Japan Ltd.): an amount that is to be 0.2% by weight in 100% by weight of the obtained second resin layer BHT (2,6-di-t-butyl-p-cresol): an amount that is to be 0.2% by weight in 1007% by weight of the obtained second resin laver Composition B2 for Forming Second Resin Layer:

Polyvinyl acetal resin (average polymerization degree: 1700, content of hydroxyl group: 24.7% by mole, acetylation degree: 0.9% by mole, acetalization degree: 74.4% by mole): 100 parts by weight Triethylene glycol di-2-ethylhexanoate (3GO): 45 parts by weight Tinuvin 326 (2-(2'-hydroxy-3'-t-butyl-5-methylphenyl)-5-chlorobenzotriazole, "Tinuvin 326" available from BASF Japan Ltd.): an amount that is to be 0.2% by weight in 100% by weight of the obtained second resin layer BHT (2,6-di-t-butyl-p-cresol): an amount that is to be 0.2; by weight in 100% by weight of the obtained second resin layer Composition C2 for Forming Second Resin Layer:

Polyvinyl acetal resin (average polymerization degree: 2300, content of hydroxyl group: 24.2% by mole, acetylation degree: 12.2% by mole, acetalization degree: 63.6% by mole): 100 parts by weight Triethylene glycol di-2-ethylhexanoate (3GO): 45 parts by weight Tinuvin 326 (2-(2'-hydroxy-3'-t-butyl-5-methylphenyl)-5-chlorobenzotriazole, "Tinuvin 326" available from BASF Japan Ltd.): an amount that is to be 0.2% by weight in 100% by weight of the obtained second resin layer BHT (2,6-di-t-butyl-p-cresol): an amount that is to be 0.2% by weight in 100% by weight of the obtained second resin layer

Comparative Example 1

Preparation of Interlayer Film:

The composition A1 for forming a first resin layer, and the composition A2 for forming a second resin layer were coextruded by using a co-extruder, and the interlayer film was wound to obtain a roll body. In this manner, a wedge-like interlayer film (having an outer shape shown in FIG. 1) having a three-layer structure of second resin layer/first resin layer/second resin layer was prepared.

Example 1

Preparation of Interlayer Film:

The composition B1 for forming a first resin layer, and the composition B2 for forming a second resin layer were coextruded by using a co-extruder, and the interlayer film was wound to obtain a roll body. In this manner, a wedge-like interlayer film (having an outer shape shown in FIG. 1) having a five-layer structure of second resin layer/first resin layer/second resin layer/first resin layer/second resin layer was prepared.

Examples 2, 3 and Comparative Examples 2, 3

The kind of the composition for forming a first resin layer, the kind of the composition for forming a second resin layer, and the wedge angle and the thickness of the interlayer film were changed as described in Tables 1 to 2. Other than these, a wedge-like interlayer film (having an outer shape shown in FIG. 1) having a five-layer laminate structure of second resin layer/first resin layer/second resin layer/first resin layer/second resin layer was prepared in the same manner as that in Example 1.

Example 4

A wedge-like interlayer film (having an outer shape shown in FIG. 1) having a five-layer laminate structure of first resin layer/second resin layer/first resin layer/second resin layer/first resin layer was prepared in the same manner as that in Example 1 except that the order of laminating first resin layers and second resin layers was changed.

Comparative Example 4

A wedge-like interlayer film (having an outer shape shown in FIG. 1) having five second resin layers was prepared in the same manner as that in Example 1 except that the compositions A2, B2 for forming second resin layers were coextruded by using a co-extruder, and the interlayer film was wound to obtain a roll body.

Example 5

The composition B1 for forming a first resin layer, and the composition B2 for forming a second resin layer were coextruded by using a co-extruder, and the interlayer film was wound to obtain a roll body. In this manner, a wedge-like interlayer film (having an outer shape shown in FIG. 1, and a second resin layer as a surface layer) having a seven-layer laminate structure in which a first resin layer and a second resin layer are alternately laminated in the thickness direction was prepared.

Example 6

The kind of the composition for forming a first resin layer, the kind of the composition for forming a second resin layer, the order of laminating a first resin layer and a second resin layer, and the wedge angle and the thickness of the interlayer film were changed as described in Tables 3 to 4. Other than these, a wedge-like interlayer film (having an outer shape shown in FIG. 1, and a first resin layer as a surface layer) having a seven-layer laminate structure in which a first resin layer and a second resin layer are alternately laminated in the thickness direction was prepared in the same manner as that in Example 5.

Examples 7, 8

The kind of the composition for forming a first resin layer, the kind of the composition for forming a second resin layer, and the wedge angle and the thickness of the interlayer film were changed as described in Tables 3 to 4. Other than these, a wedge-like interlayer film (having an outer shape shown in FIG. 1, and a second resin layer as a surface layer) having a seven-layer laminate structure in which a first resin layer and a second resin layer are alternately laminated in the thickness direction was prepared in the same manner as that in Example 5.

Example 9

The composition B1 for forming a first resin layer, and the composition B2 for forming a second resin layer were coextruded by using a co-extruder, and the interlayer film was wound to obtain a roll body. In this manner, a wedge-like interlayer film (having an outer shape shown in FIG. 1, and a second resin layer as a surface layer) having a nine-layer laminate structure in which a first resin layer and a second resin layer are alternately laminated in the thickness direction was prepared.

Example 10

The kind of the composition for forming a first resin layer, the kind of the composition for forming a second resin layer, the order of laminating a first resin layer and a second resin layer, and the wedge angle and the thickness of the interlayer film were changed as described in Tables 5 to 6. Other than these, a wedge-like interlayer film (having an outer shape shown in FIG. 1, and a first resin layer as a surface layer) having a nine-layer laminate structure in which a first resin layer and a second resin layer are alternately laminated in the thickness direction was prepared in the same manner as that in Example 9.

Example 11

The kind of the composition for forming a first resin layer, the kind of the composition for forming a second resin layer, and the wedge angle and the thickness of the interlayer film were changed as described in Tables 5 to 6. Other than these, a wedge-like interlayer film (having an outer shape shown in FIG. 1, and a second resin layer as a surface layer) having a nine-layer laminate structure in which a first resin layer and a second resin layer are alternately laminated in the thickness direction was prepared in the same manner as that in Example 9.

Example 12

The composition B1 for forming a first resin layer, and the composition B2 for forming a second resin layer were coextruded by using a co-extruder, and the interlayer film was wound to obtain a roll body. In this manner, a wedge-like interlayer film (having an outer shape shown in FIG. 1, and a second resin layer as a surface layer) having an eleven-layer laminate structure in which a first resin layer and a second resin layer are alternately laminated in the thickness direction was prepared.

Example 13

The kind of the composition for forming a first resin layer, the kind of the composition for forming a second resin layer, the order of laminating a first resin layer and a second resin layer, and the wedge angle and the thickness of the interlayer film were changed as described in Tables 5 to 6. Other than these, a wedge-like interlayer film (having an outer shape shown in FIG. 1, and a first resin layer as a surface layer) having an eleven-layer laminate structure in which a first resin layer and a second resin layer are alternately laminated in the thickness direction was prepared in the same manner as that in Example 12.

Examples 14, 15

The kind of the composition for forming a first resin layer, the kind of the composition for forming a second resin layer, and the wedge angle and the thickness of the interlayer film were changed as described in Tables 7 to 8. Other than these, a wedge-like interlayer film (having an outer shape shown in FIG. 1, and a second resin layer as a surface layer) having an eleven-layer laminate structure in which a first resin layer and a second resin layer are alternately laminated in the thickness direction was prepared in the same manner as that in Example 12.

Examples 16 to 18

The wedge angle and the thickness of the interlayer film were changed as described in Tables 7 to 8. Other than these, a wedge-like interlayer film (having a second resin layer as a surface layer) having a five-layer laminate structure in which a first resin layer and a second resin layer are alternately laminated in the thickness direction was prepared in the same manner as that in Example 3. In layer structures of Examples 16, 17, the direction in which the thicknesses of the surface layers (layer 1 and layer 5) increase is opposite to the direction in which the thickness of the entire interlayer film increases. In a layer structure of Example 8, the direction in which the thicknesses of the surface layers (layer 1 and layer 5) and the core layer (layer 3) increase is opposite to the direction in which the thickness of the entire interlayer film increases.

(Evaluation)

(1) Glass Transition Temperature Tg

The interlayer film was stored for 12 hours in an environment of a room temperature of 23±2° C. and a humidity of 25±5%. Then, viscoelasticity was measured using a viscoelasticity measuring device "ARES-G2" available from TA Instruments. A parallel plate with a diameter of 8 mm was used as a jig, and the measurement was performed in a shearing mode under the condition in which the temperature was decreased from 100° C. to −20° C. at a temperature decreasing rate of 3° C./minute and under the condition of a frequency of 1 Hz and a strain of 1%. In the measurement results obtained, the peak temperature of the loss tangent was defined as the glass transition temperature Tg (° C.). In this manner, glass transition temperatures of the first resin layer and the second resin layer in the obtained interlayer film were determined.

(2) Wedge Angle and Thickness of Interlayer Film

A thickness of the interlayer film and a wedge angle of the interlayer film were measured with a contact-type thickness meter "TOF-4R" available from Yamabun Electronics Co., Ltd. by the method described above. Also, thicknesses of the first resin layer and the second resin layer were measured by using a microscope "SE-3000" (available from SELMIC Corporation) by the method as described above. Also, by the method as described above, $Y_1/Z$, $Y_2/X$, $Y_4/Y_3$, $Y_6/Y_5$, and $T_2/T_1$ were measured, and existence of a region where $Y_2/X$ is 0.3 or less (region A) and a region where $T_2/T_1$ is 1 or more (region C) was examined. Also, an average thickness of each surface layer in the region from the position of 100 mm to the position of 400 mm from the one end toward the other end of the interlayer film (region B) was calculated.

(3) Falling Off of Winding Core

The obtained interlayer film was wound outside the winding core such that one end of the interlayer film was 10 mm distanced from an end of the winding core to obtain a roll body. The roll body was placed vertically on the floor at a room temperature of 15° C. such that the other end side of the obtained interlayer film was the top face, and a load of 70 kg was applied on the top face of the roll body, and falling off of the winding core was judged by observing whether the one end of the interlayer film came into contact with the floor.

[Criteria for Judgement in Falling Off of Winding Core]

○: the one end of the roll body does not come into contact with the floor x: the one end of the roll body comes into contact with the floor (4) Maximum Height of Crease From the obtained roll body, an interlayer film having a length of 100 cm and a width of 100 cm (width of the roll body) was cut out. The cut out interlayer film was left to stand on a flat surface in an environment of 15° C. The maximum height of the crease generated in an end part of the interlayer film after 24 hours from the start of leaving to stand was measured.

[Criteria for Judgement in Maximum Height of Crease]

○: the maximum height of the crease is less than 4 cm x: the maximum height of the crease is 4 cm or more Configurations of interlayer films and results are shown in the following Tables 1 to 8.

The meaning of each of $Y_3$, $Y_4$, $Y_5$, $Y_6$ in Tables and each of the following relationships are described below.

$Y_1/Z$: $Y_1/Z$ when a thickness by one layer of surface layers is denoted by $Y_1$ μm, and a thickness by one layer of layers neighboring the surface layers is denoted by Z μm.

$Y_2/X$: $Y_2/X$ when a thickness of the interlayer film is denoted by X μm, and a thickness by one layer of surface layers is denoted by $Y_2$ μm.

$Y_4/Y_3$: $Y_4/Y_3$ when an average thickness of a surface layer in the region from the position of 50 mm to the position of 150 mm from the one end toward the other end is denoted by $Y_3$ μm, and an average thickness of a surface layer in the region from the position of 50 mm to the position of 150 mm from the other end toward the one end is denoted by $Y_4$ μm.

$Y_6/Y_5$: $Y_6/Y_5$ when an average thickness of a layer other than surface layers in the region from the position of 50 mm to the position of 150 mm from the one end toward the other end is denoted by $Y_5$ μm, and an average thickness of a layer other than surface layers in the region from the position of 50 mm to the position of 150 mm from the other end toward the one end is denoted by $Y_5$ μm.

$T_2/T_1$: $T_2/T_1$ when a total thickness of the first resin layers is denoted by $T_1$ μm, and a total thickness of the second resin layers is denoted by $T_2$ μm.

TABLE 1

| | | Comparative Example 1 | Example 1 | Example 2 | Example 3 | Comparative Example 2 | Comparative Example 3 |
|---|---|---|---|---|---|---|---|
| Wedge angle θ of interlayer film | mrad | 0.34 | 0.29 | 0.44 | 0.67 | 0.55 | 0.3 |
| Thickness of one end of interlayer film | μm | 780 | 780 | 780 | 780 | 1:00 | 780 |
| Number of layers in interlayer film | | 3 | 5 | 5 | 5 | 5 | 5 |
| Kind of composition for forming first resin layer | | A1 | B1 | C1 | A1 | A1 | A1 |
| Kind of composition for forming second resin layer | | A2 | B2 | C2 | A2 | A2 | A2 |

TABLE 1-continued

| | | | Comparative Example 1 | Example 1 | Example 2 | Example 3 | Comparative Example 2 | Comparative Example 3 |
|---|---|---|---|---|---|---|---|---|
| Glass transition temperature Tg | Layer 1 | ° C. | 27 | 16 | 22 | 27 | 27 | 27 |
| | Layer 2 | ° C. | −4 | 2 | 13 | −4 | −4 | −4 |
| | Layer 3 | ° C. | 27 | 16 | 22 | 27 | 27 | 27 |
| | Layer 4 | ° C. | — | 2 | 13 | −4 | −4 | −4 |
| | Layer 5 | ° C. | — | 16 | 22 | 27 | 27 | 27 |
| | Layer 6 | ° C. | — | — | — | — | — | — |
| | Layer 7 | ° C. | — | — | — | — | — | — |
| | Layer 8 | ° C. | — | — | — | — | — | — |
| | Layer 9 | ° C. | — | — | — | — | — | — |
| | Layer 10 | ° C. | — | — | — | — | — | — |
| | Layer 11 | ° C. | — | — | — | — | — | — |
| Thickness of each layer at position of 400 mm from one end toward other end | Layer 1 | μm | 366.4 | 255.0 | 277.2 | 246.3 | 382.8 | 103.5 |
| | Layer 2 | μm | 183.2 | 57.3 | 61.2 | 67.1 | 84.5 | 362.3 |
| | Layer 3 | μm | 366.4 | 271.3 | 278.2 | 421.3 | 384.1 | 103.5 |
| | Layer 4 | μm | — | 57.3 | 61.2 | 67.1 | 84.5 | 362.3 |
| | Layer 5 | μm | — | 255.0 | 278.2 | 246.3 | 384.1 | 103.5 |
| | Layer 6 | μm | — | — | — | — | — | — |
| | Layer 7 | μm | — | — | — | — | — | — |
| | Layer 8 | μm | — | — | — | — | — | — |
| | Layer 9 | μm | — | — | — | — | — | — |
| | Layer 10 | μm | — | — | — | — | — | — |
| | Layer 11 | μm | — | — | — | — | — | — |

TABLE 2

| | | | Comparative Example 1 | Example 1 | Example 2 | Example 3 | Comparative Example 2 | Comparative Example 3 |
|---|---|---|---|---|---|---|---|---|
| $Y_1/Z$ | | | 2.00 | 4.45 | 4.53 | 3.67 | 4.53 | 0.29 |
| Existence of region A where value of $Y_2/X$ is 0.3 or less | | | Not exist | Exist | Exist | Exist | Exist | Exist |
| $Y_3$ | | μm | 325.6 | 230.2 | 239.0 | 199.0 | 335.0 | 81.0 |
| $Y_4$ | | μm | 434.4 | 296.3 | 341.0 | 325.0 | 462.6 | 105.0 |
| $Y_4/Y_3$ | | | 1.33 | 1.29 | 1.43 | 1.63 | 1.38 | 1.30 |
| $Y_5$ | | μm | 162.8 | 51.8 | 52.7 | 54.2 | 73.9 | 283.5 |
| $Y_6$ | | μm | 217.2 | 66.6 | 75.3 | 88.5 | 102.1 | 367.5 |
| $Y_6/Y_5$ | | | 1.33 | 1.29 | 1.43 | 1.63 | 1.38 | 1.30 |
| Average thickness of each surface layer in region B from position of 100 mm to position of 400 mm from one end toward other end of interlayer film | | μm | 417.4 | 298.5 | 343.2 | 346.8 | 465.3 | 148.5 |
| Ratio of thickness of each layer at position of 10 mm from one end toward other end (thickness of each layer/thickness of interlayer film) | Layer 1 | | 0.400 | 0.285 | 0.29 | 0.235 | 0.29 | 0.1 |
| | Layer 2 | | 0.200 | 0.064 | 0.064 | 0.064 | 0.064 | 0.35 |
| | Layer 3 | | 0.400 | 0.303 | 0.291 | 0.402 | 0.291 | 0.1 |
| | Layer 4 | | — | 0.064 | 0.064 | 0.064 | 0.064 | 0.35 |
| | Layer 5 | | — | 0.285 | 0.291 | 0.235 | 0.291 | 0.1 |
| | Layer 6 | | — | — | — | — | — | — |
| | Layer 7 | | — | — | — | — | — | — |
| | Layer 8 | | — | — | — | — | — | — |
| | Layer 9 | | — | — | — | — | — | — |
| | Layer 10 | | — | — | — | — | — | — |
| | Layer 11 | | — | — | — | — | — | — |
| Existence of region C where $T_2/T_1$ is 1 or more | | | Exist | Exist | Exist | Exist | Exist | Not exist |
| Falling off of winding core | | | X | ○ | ○ | ○ | X | X |
| Maximum height of crease | | cm | 4.3 | 2.5 | 3.7 | 1.2 | 4.1 | 4.5 |
| | | Judgement | X | ○ | ○ | ○ | X | X |

TABLE 3

| | | Example 4 | Comparative Example 4 | Example 5 | Example 6 | Example 7 | Example 8 |
|---|---|---|---|---|---|---|---|
| Wedge angle θ of interlayer film | mrad | 0.29 | 0.29 | 0.35 | 0.56 | 0.8 | 0.8 |
| Thickness of one end of interlayer film | μm | 780 | 780 | 780 | 780 | 780 | 7.80 |
| Number of layers in interlayer film | | 5 | 5 | 7 | 7 | 7 | 7 |
| Kind of composition for forming first resin layer | | B1 | — | B1 | C1 | A1 | A1 |

TABLE 3-continued

| | | | Example 4 | Comparative Example 4 | Example 5 | Example 6 | Example 7 | Example 8 |
|---|---|---|---|---|---|---|---|---|
| Kind of composition for forming second resin layer | | | B2 | A2, B2 | B2 | C2 | A2 | A2 |
| Glass transition temperature Tg | Layer 1 | ° C. | 2 | 27 | 16 | 13 | 27 | 27 |
| | Layer 2 | ° C. | 16 | 16 | 2 | 22 | −4 | −4 |
| | Layer 3 | ° C. | 2 | 27 | 16 | 13 | 27 | 27 |
| | Layer 4 | ° C. | 16 | 16 | 2 | 22 | −4 | −4 |
| | Layer 5 | ° C. | 2 | 27 | 16 | 13 | 27 | 27 |
| | Layer 6 | ° C. | — | — | 2 | 22 | −4 | −4 |
| | Layer 7 | ° C. | — | — | 16 | 13 | 27 | 27 |
| | Layer 8 | ° C. | — | — | — | — | — | — |
| | Layer 9 | ° C. | — | — | — | — | — | — |
| | Layer 10 | ° C | — | — | — | — | — | — |
| | Layer 11 | ° C. | — | — | — | — | — | — |
| Thickness of each layer at position of 400 mm from one end toward other end | Layer 1 | µm | 255.0 | 255.0 | 200.6 | 218.9 | 239.8 | 140.4 |
| | Layer 2 | µm | 57.3 | 57.3 | 39.6 | 43.2 | 47.3 | 117.0 |
| | Layer 3 | µm | 271.3 | 271.3 | 199.6 | 218.9 | 239.8 | 117.0 |
| | Layer 4 | µm | 57.3 | 57.3 | 39.6 | 43.2 | 46.2 | 351.1 |
| | Layer 5 | µm | 255.0 | 255.0 | 200.6 | 218.9 | 239.8 | 117.0 |
| | Layer 6 | µm | — | — | 39.6 | 42.2 | 47.3 | 117.0 |
| | Layer 7 | µm | — | — | 200.6 | 218.9 | 239.8 | 140.4 |
| | Layer 8 | µm | — | — | — | — | — | — |
| | Layer 9 | µm | — | — | — | — | — | — |
| | Layer 10 | µm | — | — | — | — | — | — |
| | Layer 11 | µm | — | — | — | — | — | — |

TABLE 4

| | | | Example 4 | Comparative Example 4 | Example 5 | Example 6 | Example 7 | Example 8 |
|---|---|---|---|---|---|---|---|---|
| $Y_1/Z$ | | | 4.45 | 4.45 | 5.07 | 5.07 | 5.07 | 1.20 |
| Existence of region A where value of $Y_2/X$ is 0.3 or less | | | Exist | Exist | Exist | Exist | Exist | Exist |
| $Y_3$ | | µm | 230.2 | 230.2 | 177.7 | 182.2 | 187.5 | 109.8 |
| $Y_4$ | | µm | 296.3 | 296.3 | 238.7 | 279.9 | 327.0 | 191.5 |
| $Y_4/Y_3$ | | | 1.29 | 1.29 | 1.34 | 1.54 | 1.74 | 1.74 |
| $Y_5$ | | µm | 51.8 | 51.8 | 35.0 | 35.9 | 37.0 | 91.5 |
| $Y_6$ | | µm | 66.6 | 66.6 | 47.1 | 55.2 | 64.5 | 159.6 |
| $Y_6/Y_5$ | | | 1.29 | 1.29 | 1.34 | 1.54 | 1.74 | 1.74 |
| Average thickness of each surface layer in region B from position of 100 mm to position of 400 mm from one end toward other end of interlayer film | | µm | 298.5 | 298.5 | 253.1 | 302.9 | 359.8 | 260.4 |
| Ratio of thickness of each layer at position of 10 mm from one end toward other end (thickness of each layer/ thickness of interlayer film) | Layer 1 | | 0.285 | 0.285 | 0.218 | 0.218 | 0.218 | 0.128 |
| | Layer 2 | | 0.064 | 0.064 | 0.043 | 0.043 | 0.043 | 0.106 |
| | Layer 3 | | 0.303 | 0.303 | 0.217 | 0.218 | 0.218 | 0.106 |
| | Layer 4 | | 0.064 | 0.064 | 0.043 | 0.043 | 0.042 | 0.319 |
| | Layer 5 | | 0.285 | 0.285 | 0.218 | 0.218 | 0.218 | 0.106 |
| | Layer 6 | | — | — | 0.043 | 0.042 | 0.043 | 0.106 |
| | Layer 7 | | — | — | 0.218 | 0.218 | 0.218 | 0.128 |
| | Layer 8 | | — | — | — | — | — | — |
| | Layer 9 | | — | — | — | — | — | — |
| | Layer 10 | | — | — | — | — | — | — |
| | Layer 11 | | — | — | — | — | — | — |
| Existence of region C where $T_2/T_1$ is 1 or more | | | Not exist | — | Exist | Exist | Exist | Not exist |
| Falling off of winding core | | | ○ | X | ○ | ○ | ○ | ○ |
| Maximum height of crease | | cm | 3.9 | 5.2 | 2.2 | 2.5 | 3 | 3.9 |
| | | Judgement | ○ | X | ○ | ○ | ○ | Δ |

TABLE 5

| | | Example 9 | Example 10 | Example 11 | Example 12 | Example 13 |
|---|---|---|---|---|---|---|
| Wedge angle θ of interlayer film | mrad | 0.2 | 0.59 | 0.65 | 0.36 | 0.58 |
| Thickness of one end of interlayer film | µm | 780 | 780 | 780 | 780 | 780 |
| Number of layers in interlayer film | | 9 | 9 | 9 | 11 | 11 |
| Kind of composition for forming first resin layer | | B1 | C1 | A1 | B1 | C1 |

TABLE 5-continued

| | | | Example 9 | Example 10 | Example 11 | Example 12 | Example 13 |
|---|---|---|---|---|---|---|---|
| Kind of composition for forming second resin layer | | | B2 | C2 | A2 | B2 | C2 |
| Glass transition temperature Tg | Layer 1 | ° C. | 16 | 13 | 27 | 16 | 13 |
| | Layer 2 | ° C. | 2 | 22 | −4 | 2 | 22 |
| | Layer 3 | ° C. | 16 | 13 | 27 | 16 | 13 |
| | Layer 4 | ° C. | 2 | 22 | −4 | 2 | 22 |
| | Layer 5 | ° C. | 16 | 13 | 27 | 16 | 13 |
| | Layer 6 | ° C. | 2 | 22 | −4 | 2 | 22 |
| | Layer 7 | ° C. | 16 | 13 | 27 | 16 | 13 |
| | Layer 8 | ° C. | 2 | 22 | −4 | 2 | 22 |
| | Layer 9 | ° C. | 16 | 13 | 27 | 16 | 13 |
| | Layer 10 | ° C. | — | — | — | 2 | 22 |
| | Layer 11 | ° C. | — | — | — | 16 | 13 |
| Thickness of each layer at position of 400 mm from one end toward other end | Layer 1 | μm | 149.6 | 178.8 | 181.0 | 134.0 | 146.7 |
| | Layer 2 | μm | 28.4 | 32.5 | 33.3 | 24.0 | 26.3 |
| | Layer 3 | μm | 149.6 | 176.8 | 181.0 | 134.0 | 146.7 |
| | Layer 4 | μm | 27.5 | 32.5 | 33.3 | 24.0 | 26.3 |
| | Layer 5 | μm | 149.6 | 176.8 | 181.0 | 134.0 | 146.7 |
| | Layer 6 | μm | 28.4 | 32.5 | 33.3 | 24.0 | 26.3 |
| | Layer 7 | μm | 149.6 | 176.8 | 181.0 | 134.0 | 146.7 |
| | Layer 8 | μm | 27.5 | 32.5 | 33.3 | 24.0 | 26.3 |
| | Layer 9 | μm | 149.6 | 176.8 | 183.0 | 134.0 | 146.7 |
| | Layer 10 | μm | — | — | — | 24.0 | 26.3 |
| | Layer 11 | μm | — | — | — | 134.0 | 146.7 |

TABLE 6

| | | | Example 9 | Example 10 | Example 11 | Example 12 | Example 13 |
|---|---|---|---|---|---|---|---|
| $Y_1/Z$ | | | 5.27 | 5.50 | 5.44 | 5.58 | 5.58 |
| Existence of region A where value of $Y_2/X$ is 0.3 or less | | | Exist | Exist | Exist | Exist | Exist |
| $Y_3$ | | μm | 139.2 | 147.7 | 147.0 | 118.3 | 121.5 |
| $Y_4$ | | μm | 167.0 | 230.7 | 237.5 | 160.1 | 188.8 |
| $Y_4/Y_3$ | | | 1.20 | 1.56 | 1.62 | 1.35 | 1.55 |
| $Y_5$ | | μm | 26.4 | 26.8 | 27.0 | 21.2 | 21.8 |
| $Y_6$ | | μm | 31.7 | 42.0 | 43.7 | 28.7 | 33.9 |
| $Y_6/Y_5$ | | | 1.20 | 1.56 | 1.62 | 1.35 | 1.55 |
| Average thickness of each surface layer in region B from position of 100 mm to position of 400 mm from one end toward other end of interlayer film | | μm | 179.6 | 267.3 | 278.5 | 188.0 | 233.7 |
| Ratio of thickness of each layer at position of 10 mm from one end toward other end (thickness of each layer/thickness of interlayer film) | Layer 1 | | 0.174 | 0.176 | 0.174 | 0.145 | 0.145 |
| | Layer 2 | | 0.033 | 0.032 | 0.032 | 0.026 | 0.026 |
| | Layer 3 | | 0.174 | 0.174 | 0.174 | 0.145 | 0.145 |
| | Layer 4 | | 0.032 | 0.032 | 0.032 | 0.026 | 0.026 |
| | Layer 5 | | 0.174 | 0.174 | 0.174 | 0.145 | 0.145 |
| | Layer 6 | | 0.033 | 0.032 | 0.032 | 0.026 | 0.026 |
| | Layer 7 | | 0.174 | 0.174 | 0.174 | 0.145 | 0.145 |
| | Layer 8 | | 0.032 | 0.032 | 0.032 | 0.026 | 0.026 |
| | Layer 9 | | 0.174 | 0.174 | 0.176 | 0.145 | 0.145 |
| | Layer 10 | | — | — | — | 0.026 | 0.026 |
| | Layer 11 | | — | — | — | 0.145 | 0.145 |
| Existence of region C where $T_2/T_1$ is 1 or more | | | Exist | Exist | Exist | Exist | Exist |
| Falling off of winding core | | | ○ | ○ | ○ | ○ | ○ |
| Maximum height of crease | | cm | 1.9 | 2.2 | 1.8 | 0.5 | 0.8 |
| | | Judgement | ○ | ○ | ○ | ○ | ○ |

TABLE 7

| | | Example 14 | Example 15 | Example 16 | Example 17 | Example 18 |
|---|---|---|---|---|---|---|
| Wedge angle θ of interlayer film | mrad | 0.81 | 0.4 | 0.5 | 0.7 | 0.55 |
| Thickness of one end of interlayer film | μm | 780 | 1020 | 780 | 780 | 780 |
| Number of layers in interlayer film | | 11 | 11 | 5 | 5 | 5 |
| Kind of composition for forming first resin layer | | A1 | A1 | A1 | A1 | A1 |

TABLE 7-continued

| | | | Example 14 | Example 15 | Example 16 | Example 17 | Example 18 |
|---|---|---|---|---|---|---|---|
| Kind of composition for forming second resin layer | | | A2 | A2 | A2 | A2 | A2 |
| Glass transition temperature Tg | Layer 1 | ° C. | 27 | 27 | 27 | 27 | 27 |
| | Layer 2 | ° C. | −4 | −4 | −4 | −4 | −4 |
| | Layer 3 | ° C. | 27 | 27 | 27 | 27 | 27 |
| | Layer 4 | ° C. | −4 | −4 | −4 | −4 | −4 |
| | Layer 5 | ° C. | 27 | 27 | 27 | 27 | 27 |
| | Layer 6 | ° C. | −4 | −4 | — | — | — |
| | Layer 7 | ° C. | 27 | 27 | — | — | — |
| | Layer 8 | ° C. | −4 | −4 | — | — | — |
| | Layer 9 | ° C. | 27 | 27 | — | — | — |
| | Layer 10 | ° C. | −4 | −4 | — | — | — |
| | Layer 11 | ° C. | 27 | 27 | — | — | — |
| Thickness of each layer at position of 400 mm from one end toward other end | Layer 1 | μm | 160.1 | 171.1 | 289.5 | 346.9 | 327.3 |
| | Layer 2 | μm | 28.7 | 30.7 | 61.3 | 66.3 | 52.1 |
| | Layer 3 | μm | 160.1 | 171.1 | 278.4 | 233.7 | 241.2 |
| | Layer 4 | μm | 28.7 | 30.7 | 61.3 | 66.3 | 52.1 |
| | Layer 5 | μm | 160.1 | 171.1 | 289.5 | 346.9 | 327.3 |
| | Layer 6 | μm | 28.7 | 30.7 | — | — | — |
| | Layer 7 | μm | 160.1 | 171.1 | — | — | — |
| | Layer 8 | μm | 28.7 | 30.7 | — | — | — |
| | Layer 9 | μm | 160.1 | 171.1 | — | — | — |
| | Layer 10 | μm | 28.7 | 30.7 | — | — | — |
| | Layer 11 | μm | 160.1 | 171.1 | — | — | — |

TABLE 8

| | | | Example 14 | Example 15 | Example 16 | Example 17 | Example 18 |
|---|---|---|---|---|---|---|---|
| $Y_1/Z$ | | | 5.58 | 5.58 | 4.29 | 4.61 | 6.19 |
| Existence of region A where value of $Y_2/X$ is 0.3 or less | | | Exist | Exist | Exist | Exist | Exist |
| $Y_3$ | | μm | 124.8 | 153.7 | 279.1 | 324.3 | 318.7 |
| $Y_4$ | | μm | 218.8 | 200.1 | 271.7 | 319.8 | 287.0 |
| $Y_4/Y_3$ | | | 1.75 | 1.30 | 0.97 | 0.99 | 0.90 |
| $Y_5$ | | μm | 22.4 | 27.6 | 51.1 | 52.0 | 49.7 |
| $Y_6$ | | μm | 39.2 | 35.9 | 80.8 | 93.6 | 48.3 |
| $Y_6/Y_5$ | | | 1.75 | 1.30 | 1.58 | 1.80 | 0.97 |
| Average thickness of each surface layer in region B from position of 100 mm to position of 400 mm from one end toward other end of interlayer film | | μm | 281.6 | 231.1 | 285.2 | 337.3 | 324.3 |
| Ratio of thickness of each layer at position of 10 mm from one end toward other end (thickness of each layer/ thickness of interlayer film) | Layer 1 | | 0.145 | 0.145 | 0.35 | 0.4 | 0.4 |
| | Layer 2 | | 0.026 | 0.026 | 0.0625 | 0.0625 | 0.0625 |
| | Layer 3 | | 0.145 | 0.145 | 0.175 | 0.075 | 0.075 |
| | Layer 4 | | 0.026 | 0.026 | 0.0625 | 0.0625 | 0.0625 |
| | Layer 5 | | 0.145 | 0.145 | 0.35 | 0.4 | 0.4 |
| | Layer 6 | | 0.026 | 0.026 | — | — | — |
| | Layer 7 | | 0.145 | 0.145 | — | — | — |
| | Layer 8 | | 0.026 | 0.026 | — | — | — |
| | Layer 9 | | 0.145 | 0.145 | — | — | — |
| | Layer 10 | | 0.026 | 0.026 | — | — | — |
| | Layer 11 | | 0.145 | 0.145 | — | — | — |
| Existence of region C where $T_2/T_1$ is 1 or more | | | Exist | Exist | Exist | Exist | Exist |
| Falling off of winding core | | | ○ | ○ | ○ | ○ | ○ |
| Maximum height of crease | | cm | 0.8 | 0.9 | 1.5 | 2 | 3 |
| | | Judgement | ○ | ○ | ○ | ○ | ○ |

Laminated glasses were prepared using interlayer films obtained in Examples 1 to 15, and in Examples 1 to 3 in which the surface layer is a second resin layer, deaeration in preparing laminated glass was excellent compared with Example 4 in which the surface layer is a first resin layer. In Examples 5, 7, 8 in which the surface layer is a second resin layer, deaeration in preparing laminated glass was excellent compared with Example 6 in which the surface layer is a first resin layer. In Examples 9, 11 in which the surface layer is a second resin layer, deaeration in preparing laminated glass was excellent compared with Example 10 in which the surface layer is a first resin layer. In Examples 12, 14, 15 in which the surface layer is a second resin layer, deaeration in preparing laminated glass was excellent compared with Example 13 in which the surface layer is a first resin layer. In the laminated glasses prepared with the interlayer films of Examples 1 to 3, 5, 7 to 9, 11, 12, 14, 15 in which the surface layer is a second resin layer, the optical strain was controlled in comparison with the laminated glasses prepared with the interlayer films of Examples 4, 6, 10, 13 in which the surface layer is a first resin layer.

EXPLANATION OF SYMBOLS

10, 10A, 10B, 10C: Interlayer film

10*a*: One end

10*b*: Other end

11, 11A, 11B, 11C, 12, 12A, 12B, 12C: First resin layer

20: Laminated glass

21, 21A, 21B, 21C, 22, 22A, 22B, 22C, 23, 23A, 23B, 23C: Second resin layer

31: First lamination glass member

32: Second lamination glass member

The invention claimed is:

1. An interlayer film for laminated glass, the interlayer film comprising:

one end and the other end being on an opposite side of the one end, the one end having a thickness of 1.05 mm or less;

a first resin layer having a glass transition temperature of less than 15° C.;

a second resin layer having a glass transition temperature of 15° C. or more; and a region where a total number of laminated layers of the first resin layer and the second resin layer in a thickness direction is five or more and ten or less, the region where the total number of laminated layers is five or more and ten or less, the region having $Y_1/Z$ being 3.67 or more and 6.19 or less when a thickness by one layer of surface layers is denoted by $Y_1$ μm and a thickness by one layer of layers neighboring the surface layers is denoted by Z μm, wherein the interlayer film has a length L from the one end and the other end of the interlayer film and the length L is 0.5 m or more, and wherein, when an average thickness of a layer other than surface layers in a region from a position of 50 mm to a position of 150 mm from the one end of the length L of the interlayer film is denoted by $Y_5$ μm and an average thickness of a layer other than surface layers in a region from a position of 50 mm to a position of 150 mm from the other end of the length L of the interlayer film is denoted by $Y_6$ μm, $Y_6/Y_5$ is 1.20 or more and 2.5 or less.

2. The interlayer film for laminated glass according to claim 1, wherein the other end has a thickness that is larger than a thickness of the one end.

3. The interlayer film for laminated glass according to claim 1, having a region where the first resin layer and the second resin layer are alternately laminated in the thickness direction.

4. The interlayer film for laminated glass according to claim 1, wherein a surface layer is the second resin layer.

5. The interlayer film for laminated glass according to claim 1, wherein when a thickness of the interlayer film is denoted by X μm, and a thickness by one layer of surface layers is denoted by $Y_2$ μm, the interlayer film has a region where $Y_2/X$ is 0.3 or less.

6. The interlayer film for laminated glass according to claim 1, wherein an average thickness of each surface layer in a region from a position of 100 mm to a position of 400 mm from the one end of the length L of the interlayer film is less than 300 μm.

7. The interlayer film for laminated glass according to claim 1, wherein when an average thickness of a surface layer in a region from a position of 50 mm to a position of 150 mm from the one end of the length L of the interlayer film is denoted by $Y_3$ μm, and an average thickness of a surface layer in a region from a position of 50 mm to a position of 150 mm from the other end of the length L of the interlayer film is denoted by $Y_4$ μm, $Y_4/Y_3$ is 2.5 or less.

8. The interlayer film for laminated glass according to claim 1, wherein the interlayer film has a region for display corresponding to a display region of a head-up display, and an average thickness of each surface layer in the region for display is less than 300 μm.

9. The interlayer film for laminated glass according to claim 1, wherein when a total thickness of layers of the first resin layer is denoted by $T_1$ μm, and a total thickness of layers of the second resin layer is denoted by $T_2$ μm, the interlayer film has a region where $T_2/T_1$ is 1 or more.

10. The interlayer film for laminated glass according to claim 1, wherein a wedge angle θ of the interlayer film is 0.05 mrad or more.

11. A laminated glass comprising:

a first lamination glass member;

a second lamination glass member; and the interlayer film for laminated glass according to claim 1, the interlayer film for laminated glass being arranged between the first lamination glass member and the second lamination glass member.

* * * * *